(12) United States Patent
Shibata et al.

(10) Patent No.: US 7,920,341 B2
(45) Date of Patent: Apr. 5, 2011

(54) OPTICAL SYSTEM, IMAGING APPARATUS, AND METHOD FOR FORMING IMAGE BY THE OPTICAL SYSTEM

(75) Inventors: Satoru Shibata, Yokohama (JP); Satoshi Hayakawa, Ichikawa (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/167,687

(22) Filed: Jul. 3, 2008

(65) Prior Publication Data
US 2009/0034100 A1 Feb. 5, 2009

(30) Foreign Application Priority Data
Jul. 24, 2007 (JP) .................. 2007-192369

(51) Int. Cl.
*G02B 9/34* (2006.01)
(52) U.S. Cl. ........................ 359/781; 359/900
(58) Field of Classification Search .............. 359/686, 359/781, 771, 900
See application file for complete search history.

(56) References Cited

U.S. PATENT DOCUMENTS

| | | | |
|---|---|---|---|
| 6,618,198 B1 | 9/2003 | Endo | |
| 6,972,909 B2 | 12/2005 | Hamano et al. | |
| 7,102,829 B2 | 9/2006 | Nishimura | |
| 7,196,852 B2 | 3/2007 | Nishimura | |
| 7,259,920 B2 | 8/2007 | Sekita | |
| 7,307,794 B2 | 12/2007 | Saori | |
| 7,307,795 B2 | 12/2007 | Sekita | |
| 7,403,345 B2 * | 7/2008 | Ichikawa et al. | 359/781 |
| 7,443,599 B2 * | 10/2008 | Kohno et al. | 359/682 |

FOREIGN PATENT DOCUMENTS

| | | |
|---|---|---|
| JP | 11-174329 | 7/1999 |
| JP | 2004-061910 | 2/2004 |
| JP | 2004-61910 A | 2/2004 |
| JP | 2005-092056 | 4/2005 |
| JP | 2005-234460 | 9/2005 |
| JP | 2005-242014 | 9/2005 |
| JP | 2005-309124 | 11/2005 |
| JP | 2006-113573 | 4/2006 |

OTHER PUBLICATIONS

Extended European Search Report and Opinion from EP Appln. No. 08252316.8.

* cited by examiner

*Primary Examiner* — Jack Dinh
(74) *Attorney, Agent, or Firm* — Miles & Stockbridge P.C.

(57) ABSTRACT

Providing an optical system having excellent optical performance, an imaging apparatus, and a method for forming an image by the optical system. The optical system includes, in order from an object, a first lens group G1 having negative refractive power, a second lens group G2 having positive refractive power, a third lens group G3 having negative refractive power, and a fourth lens group G4 having positive refractive power. At least one of the first lens group G1, the second lens group G2, the third lens group G3, and the fourth lens group G4 has at least one A lens satisfying given conditional expressions.

30 Claims, 19 Drawing Sheets

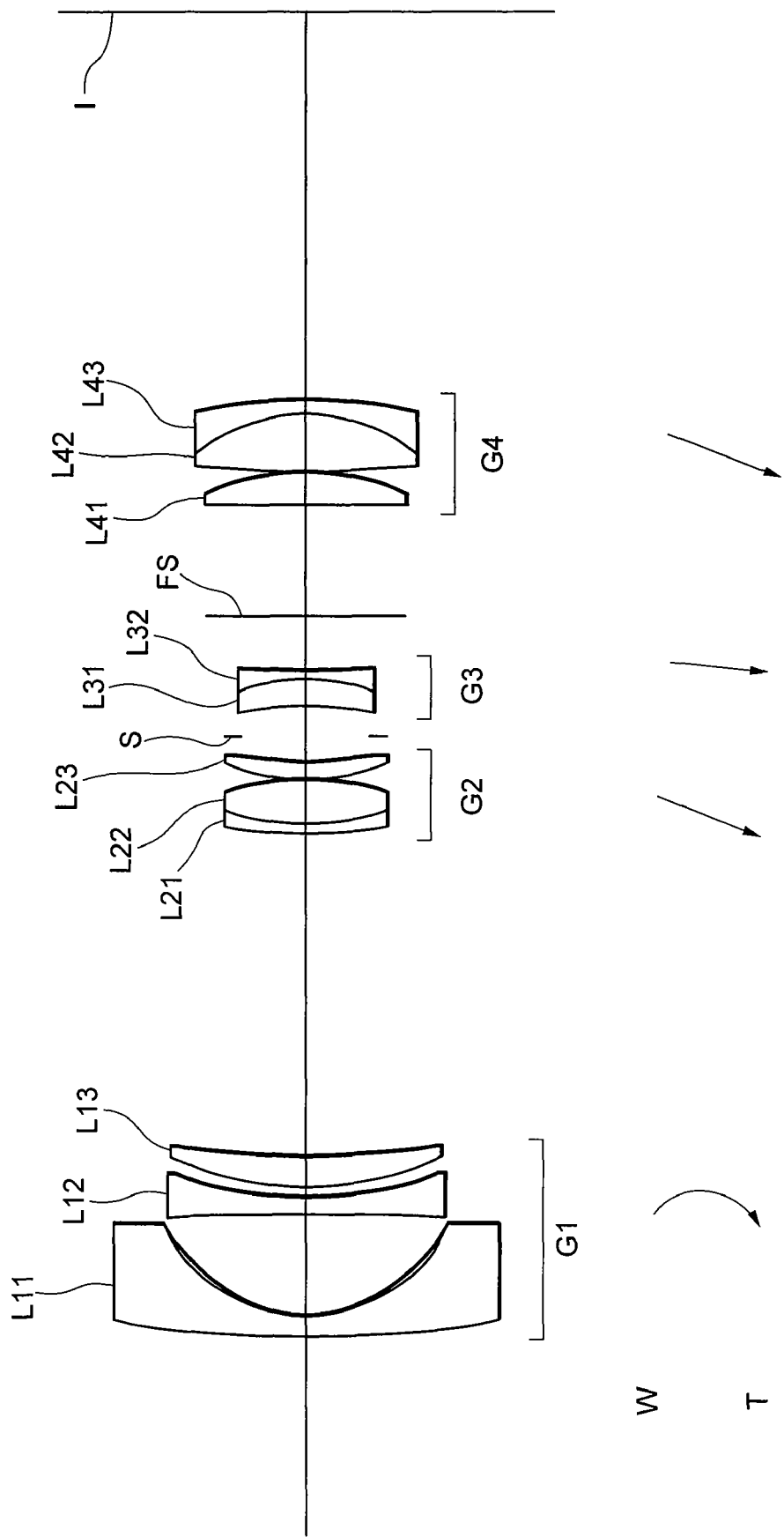

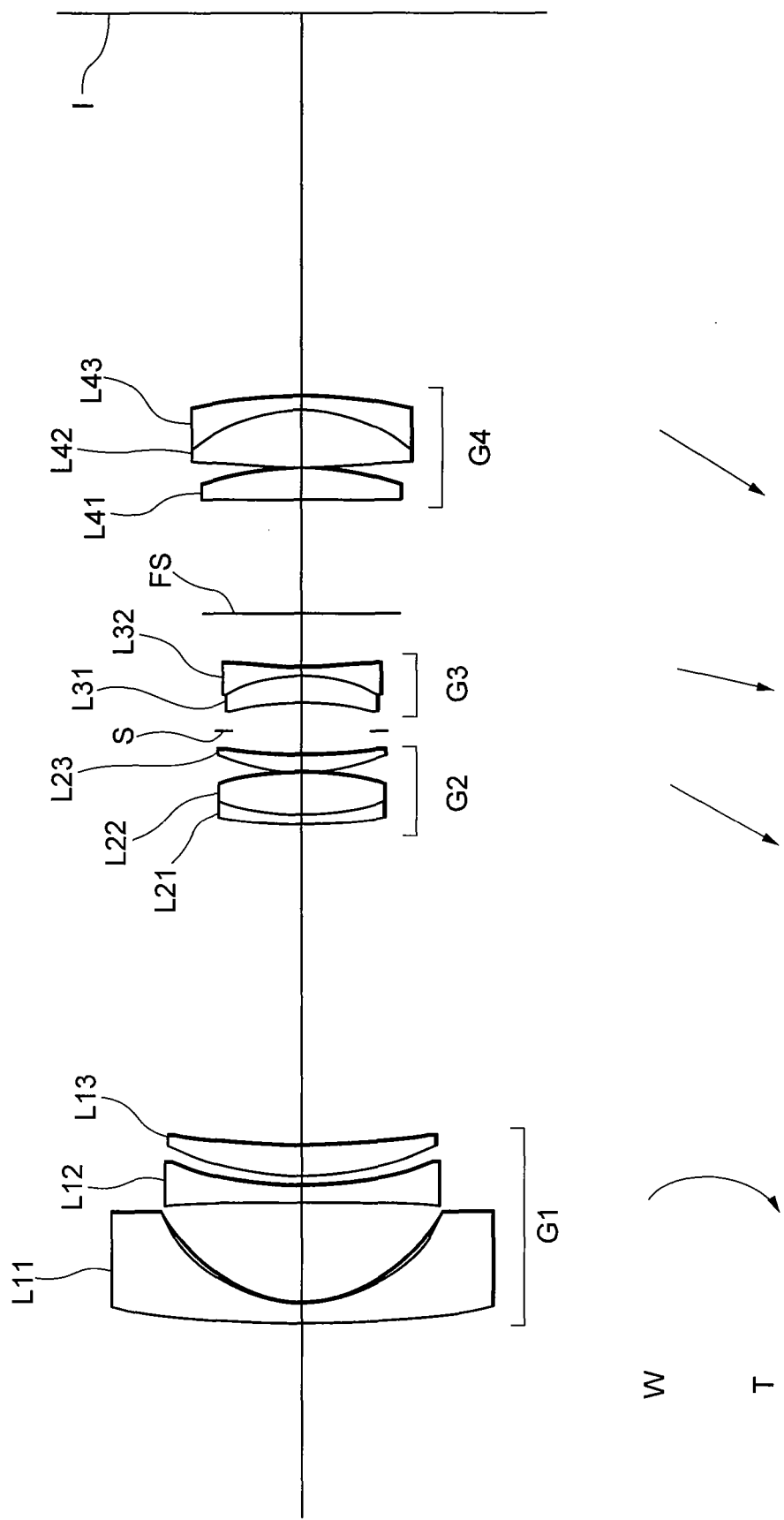

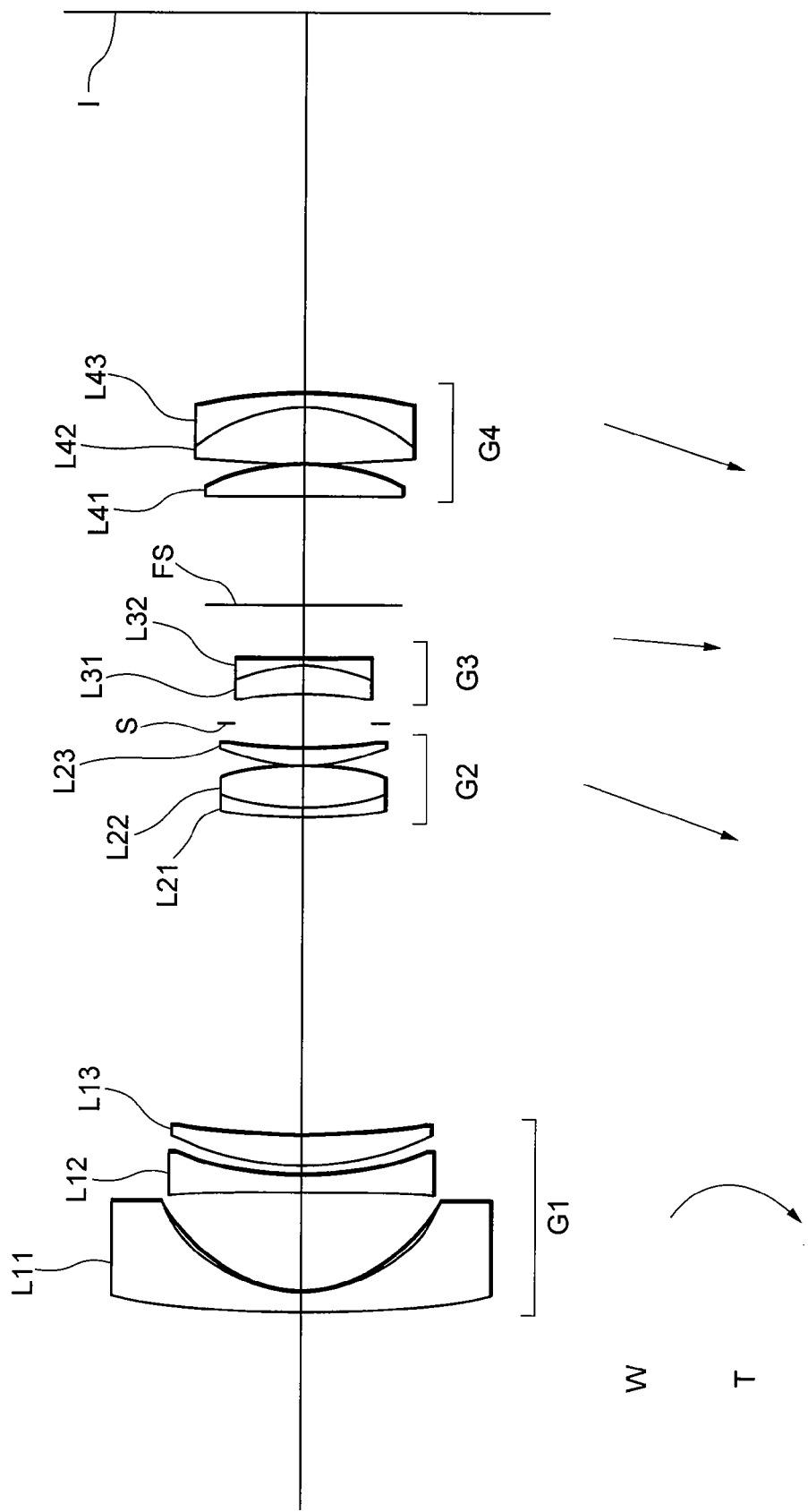

OPTICAL SYSTEM, IMAGING APPARATUS, AND METHOD FOR FORMING IMAGE BY THE OPTICAL SYSTEM

The disclosure of the following priority application is herein incorporated by reference:

Japanese Patent Application No. 2007-192369 filed on Jul. 24, 2007.

BACKGROUND OF THE INVENTION

1. Field of the Invention

The present invention relates to an optical system, an imaging apparatus, and a method for forming an image by the optical system.

2. Related Background Art

There has been proposed an optical system suitable for a film camera, an electronic still camera, a video camera, and the like such as Japanese Patent Application Laid-Open No. 2004-61910.

However, such a conventional optical system has been unable to sufficiently correct lateral chromatic aberration or curvature of field in a wide-angle end state.

SUMMARY OF THE INVENTION

The present invention has made in view of above described problems and has an object to provide an optical system having excellent optical performance, an imaging apparatus, and a method for forming an image by the optical system.

According to a first aspect of the present invention, there is provided an optical system comprising, in order from the object: a first lens group having negative refractive power; a second lens group having positive refractive power; a third lens group having negative refractive power; and a fourth lens group having positive refractive power; at least one of the first lens group, the second lens group, the third lens group, and the fourth lens group has at least one A lens which satisfies the following conditional expressions (1) and (2):

$$1.85000 < nA \tag{1}$$

$$-0.92 < fA/fG < -0.10 \tag{2}$$

where nA denotes a refractive index of the medium of the A lens at d-line (wavelength $\lambda$=587.6 nm), fA denotes a focal length of the A lens, and fG denotes a focal length of the lens group having the A lens.

According to a second aspect of the present invention, there is provided an imaging apparatus equipped with the optical system according to the first aspect.

According to a third aspect of the present invention, there is provided an optical system comprising, in order from an object: a first lens group having negative refractive power; a second lens group having positive refractive power; a third lens group having negative refractive power; and a fourth lens group having positive refractive power; at least one of the first lens group, the second lens group, the third lens group, and the fourth lens group has at least one A lens which satisfies the following conditional expression (4):

$$1.87300 < nA \tag{4}$$

where nA denotes a refractive index of a medium of the A lens at d-line (wavelength $\lambda$=587.6 nm).

According to a fourth aspect of the present invention, there is provided an imaging apparatus equipped with the optical system according to the third aspect.

According to a fifth aspect of the present invention, there is provided a method for forming an image of an optical system comprising a step of: providing the optical system including, in order from an object, a firs lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expressions (1) and (2):

$$1.85000 < nA \tag{1}$$

$$-0.92 < fA/fG < -0.10 \tag{2}$$

where nA denotes a refractive index of the medium of the A lens at d-line (wavelength $\lambda$=587.6 nm), fA denotes a focal length of the A lens, and fG denotes a focal length of the lens group having the A lens.

According to a sixth aspect of the present invention, there is provided a method for forming an image of an optical system comprising a step of: providing the optical system including, in order from an object, a firs lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expression (4):

$$1.87300 < nA \tag{4}$$

where nA denotes a refractive index of a medium of the A lens at d-line (wavelength $\lambda$=587.6 nm).

The present invention makes it possible to provide an optical system having excellent optical performance, an imaging apparatus, and a method for forming an image by the optical system.

BRIEF DESCRIPTION OF THE DRAWINGS

FIG. 1 is a sectional view showing a lens configuration of an optical system according to Example 1 of the present application in a wide-angle end state.

FIGS. 2A and 2B are graphs showing various aberrations of the optical system according to Example 1 in the wide-angle end state upon focusing on infinity, in which FIG. 2A shows various aberrations without performing vibration reduction, and FIG. 2B shows coma upon performing vibration reduction with respect to a rotational camera shake of 0.734 degrees.

FIGS. 4A and 4B are graphs showing various aberrations of the optical system according to Example 1 in a telephoto end state upon focusing on infinity, in which FIG. 4A shows various aberrations without performing vibration reduction, and FIG. 4B shows coma upon performing vibration reduction with respect to a rotational camera shake of 0.432 degrees.

FIG. 5 is a sectional view showing a lens configuration of an optical system according to Example 2 of the present application in a wide-angle end state.

FIGS. 6A and 6B are graphs showing various aberrations of the optical system according to Example 2 in the wide-angle end state upon focusing on infinity, in which FIG. 6A shows various aberrations without performing vibration reduction, and FIG. 6B shows coma upon performing vibration reduction with respect to a rotational camera shake of 0.734 degrees.

FIGS. 8A and 8B are graphs showing various aberrations of the optical system according to Example 2 in a telephoto end state upon focusing on infinity, in which FIG. 8A shows various aberrations without performing vibration reduction, and FIG. 8B shows coma upon performing vibration reduction with respect to a rotational camera shake of 0.43 degrees.

FIGS. 10A and 10B are graphs showing various aberrations of the optical system according to Example 3 in the wide-angle end state upon focusing on infinity, in which FIG. 10A shows various aberrations without performing vibration reduction, and FIG. 10B shows coma upon performing vibration reduction with respect to a rotational camera shake of 0.734 degrees.

FIGS. 12A and 12B are graphs showing various aberrations of the optical system according to Example 3 in a telephoto end state upon focusing on infinity, in which FIG. 12A shows various aberrations without performing vibration reduction, and FIG. 12B shows coma upon performing vibration reduction with respect to a rotational camera shake of 0.432 degrees.

FIG. 13 is a sectional view showing a lens configuration of an optical system according to Example 4 of the present application in a wide-angle end state.

FIGS. 14A and 14B are graphs showing various aberrations of the optical system according to Example 4 in the wide-angle end state upon focusing on infinity, in which FIG. 14A shows various aberrations without performing vibration reduction, and FIG. 14B shows coma upon performing vibration reduction with respect to a rotational camera shake of 0.734 degrees.

FIGS. 16A and 16B are graphs showing various aberrations of the optical system according to Example 4 in a telephoto end state upon focusing on infinity, in which FIG. 16A shows various aberrations without performing vibration reduction, and FIG. 16B shows coma upon performing vibration reduction with respect to a rotational camera shake of 0.432 degrees.

FIGS. 18A and 18B are graphs showing various aberrations of the optical system according to Example 5 upon focusing on infinity, in which FIG. 18A shows various aberrations without performing vibration reduction, and FIG. 18B shows coma upon performing vibration reduction with respect to a rotational camera shake of 0.734 degrees.

DESCRIPTION OF THE MOST PREFERRED EMBODIMENT

Figure 2A:
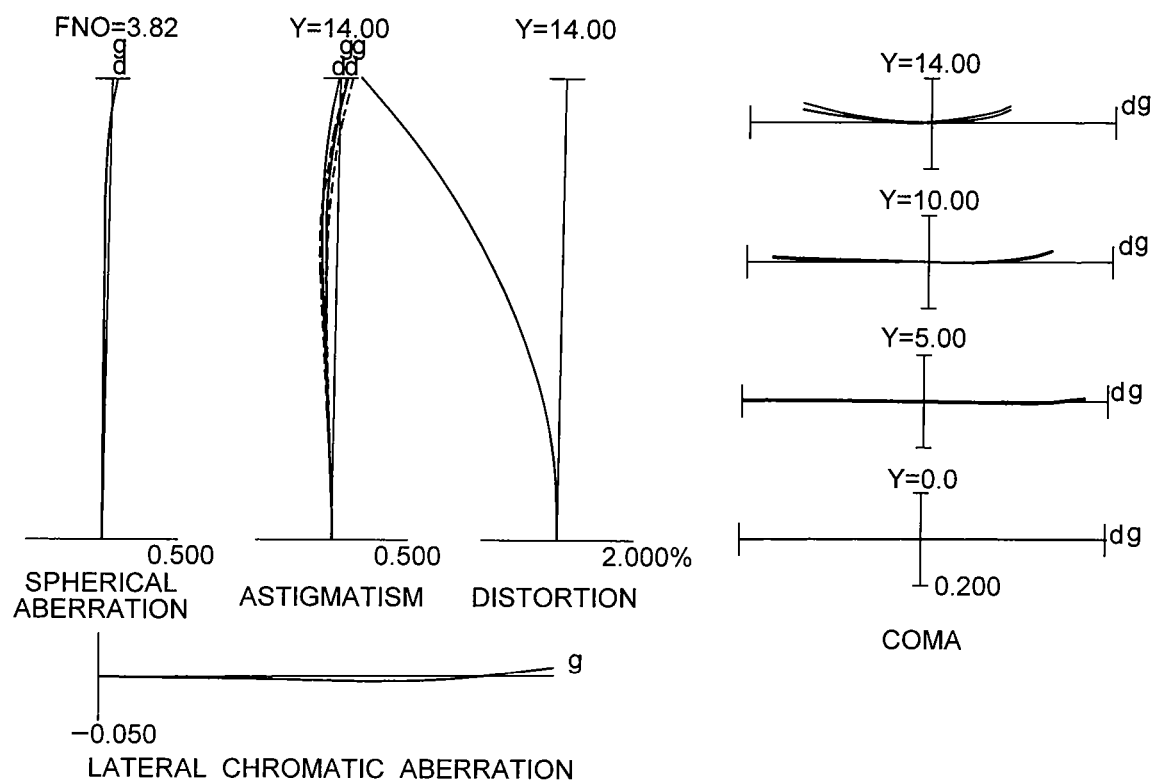

An optical system, an imaging apparatus and a method for forming an image by the optical system according to the present application are explained below.

An optical system according to the present application includes, in order from an object, a first lens group having negative refractive power, a second lens group having positive refractive power, a third lens group having negative refractive power, and a fourth lens group having positive refractive power. At least one of the first lens group, the second lens group, the third lens group, and the fourth lens group has at least one A lens. The A lens satisfies the following conditional expressions (1) and (2):

$$1.85000 < nA \qquad (1)$$

$$-0.92 < fA/fG < -0.10 \qquad (2)$$

where nA denotes a refractive index of a medium of the A lens at d-line (wavelength λ=587.6 nm), fA denotes a focal length of the A lens, and fG denotes a focal length of the lens group including the A lens.

Conditional expression (1) defines a refractive index of the A lens in order to realize excellent optical performance of an optical system according to the present application.

When the value nA is equal to or falls below the lower limit of conditional expression (1), the radius of curvature of the A lens becomes small in order to keep refractive power of the A lens, so that it becomes difficult to excellently correct curvature of field and coma. In order to secure the effect of the present application, it is preferable to set the lower limit of conditional expression (1) to 1.86000.

As described above, with satisfying conditional expression (1), an optical system according to the present application makes it possible to realize excellent optical performance.

Conditional expression (2) defines a relation between the focal length of the A lens and that of the lens group including the A lens in order to realize excellent optical performance of an optical system according to the present application.

When the ratio fA/fG is equal to or falls below the lower limit of conditional expression (2), an absolute value of fA becomes relatively large, and refractive power of the A lens becomes weak, so that it becomes difficult to sufficiently correct spherical aberration. In order to secure the effect of the present application, it is preferable to set the lower limit of conditional expression (2) to −0.88.

On the other hand, when the ratio fA/fG is equal to or exceeds the upper limit of conditional expression (2), an absolute value of fG becomes relatively large, and refractive power of the lens group including the A lens becomes small, so that it becomes difficult to sufficiently correct curvature of field. In order to secure the effect of the present application, it is preferable to set the upper limit of conditional expression (2) to −0.20.

As described above, with satisfying conditional expression (2), an optical system according to the present application makes it possible to realize excellent optical performance.

Another optical system according to the present application includes, in order from an object, a first lens group having negative refractive power, a second lens group having positive refractive power, a third lens group having negative refractive power, and a fourth lens group having positive refractive power. At least one of the first lens group, the second lens group, the third lens group, and the fourth lens group has at least one A lens which satisfies the following conditional expression (4):

$$1.87300 < nA \quad (4)$$

where nA denotes a refractive index of a medium of the A lens at d-line (wavelength λ=587.6 nm).

Conditional expression (4) defines a refractive index of the A lens in order to realize excellent optical performance of an optical system according to the present application.

When the value nA is equal to or falls below the lower limit of conditional expression (4), in order to keep refractive power of the A lens, the radius of curvature of the A lens becomes small, so that it becomes difficult to excellently correct curvature of field and coma. In order to secure the effect of the present application, it is preferable to set the lower limit of conditional expression (4) to 1.88000.

As described above, with satisfying conditional expression (4), an optical system according to the present application makes it possible to realize excellent optical performance.

In an optical system according to the present application, the A lens preferably satisfies the following conditional expression (3):

$$\nu A < 45.0 \quad (3)$$

where νA denotes an Abbe number of the medium of the A lens at d-line (wavelength λ=587.6 nm).

Conditional expression (3) defines an Abbe number of the A lens in order to excellently correct longitudinal chromatic aberration and lateral chromatic aberration of the optical system according to the present application.

When the value νA is equal to or exceeds the upper limit of conditional expression (3), the Abbe number of the A lens becomes large, so that it becomes impossible to sufficiently correct chromatic aberration in the lens group including the A lens and in the optical system. In order to secure the effect of the present application, it is preferable to set the upper limit of conditional expression (3) to 41.0.

As described above, with satisfying conditional expression (3), an optical system according to the present application makes it possible to excellently correct longitudinal chromatic aberration and lateral chromatic aberration.

An optical system according to the present application carries out vibration reduction on the image plane upon generating a camera shake by shifting a lens group or a portion of a lens group in the optical system as a vibration reduction lens group in a direction perpendicular to the optical axis. The vibration reduction lens group preferably includes an A lens.

With this configuration in an optical system according to the present application, the radius of curvature of the A lens in the vibration reduction lens group becomes large, so that generation of decentered coma upon sifting the vibration reduction lens group becomes small, and excellent optical performance can be maintained.

In an optical system according to the present application, the vibration reduction lens group is preferably the third lens group or a portion of the third lens group.

With this configuration, an optical system according to the present application becomes possible to make correction of spherical aberration consistent with correction of an image blur upon vibration reduction.

In an optical system according to the present application, at least one of the A lens is preferably cemented with another lens.

With this configuration, an optical system according to the present application makes it possible to excellently correct longitudinal chromatic aberration and lateral chromatic aberration, and to make the system insensitive to decentering.

In an optical system according to the present application, at least one lens group including the A lens is preferably composed of two lenses or less.

With this configuration, an optical system according to the present application makes it possible to construct the system simple, and to make the system insensitive to decentering, so that decentering coma can be suppressed.

In an optical system according to the present application, varying focal length from the wide-angle end state to the telephoto end state is preferably carried out by varying a distance between the first lens group and the second lens group, a distance between the second lens group and the third lens group, and a distance between the third lens group and the fourth lens group.

With this configuration, an optical system according to the present application makes it possible to easily vary the focal length, and to excellently correct curvature of field and spherical aberration over entire focal length range from the wide-angle end state to the telephoto end state.

In an optical system according to the present application, the second lens group and the fourth lens group are preferably moved in a body upon varying a focal length from the wide-angle end state to the telephoto end state.

With this configuration, an optical system according to the present application makes it possible to excellently correct curvature of field. Moreover, curvature of field and coma caused by a decentering error of the lens groups generated upon moving these lens groups can be suppressed.

An imaging apparatus according to the present application is equipped with the above-described optical system.

With this configuration, it becomes possible to realize an imaging apparatus having excellent optical performance.

A method for forming an image by an optical system according to the present application comprising a step of: providing the optical system including, in order from an object, a firs lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expressions:

$$1.85000 < nA$$

$$-0.92 < fA/fG < -0.10$$

where nA denotes a refractive index of the medium of the A lens at d-line (wavelength λ=587.6 nm), fA denotes a focal length of the A lens, and fG denotes a focal length of the lens group having the A lens.

With this configuration, it becomes possible to realize an optical system having excellent optical performance.

An optical system according to each numerical example of the present application is explained below with reference to accompanying drawings.

EXAMPLE 1

FIG. 1 is a sectional view showing a lens configuration of an optical system according to Example 1 of the present application in a wide-angle end state.

The optical system according to Example 1 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and forming an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. As shown later in Table 1, the positive meniscus lens L31 satisfies the above-described conditional expressions (1), (2), (3) and (4).

The fourth lens group G4 is composed of, in order from the object, a plano-convex positive lens L41 having a plane surface facing the object, and a cemented lens constructed by a double convex positive lens L42 cemented with a negative meniscus lens L43 having a convex surface facing the image.

In the optical system according to Example 1, an aperture stop S is disposed between the second lens group G2 and the third lens group G3. A flare stopper FS is disposed between the third lens group G3 and the fourth lens group G4.

In the optical system according to Example 1, upon varying a focal length from a wide-angle end state to a telephoto end state, the first lens group G1 is moved at first to the image and then to the object, the second lens group G2, the third lens group G3 and the fourth lens group G4 are moved to the object such that a distance between the second lens group G2 and the third lens group G3 increases, a distance between the third lens group G3 and the fourth lens group G4 decreases. In this case, the second lens group G2 and the fourth lens group G4 are moved in a body to the object. Upon varying a focal length from the wide-angle end state to the telephoto end state, the aperture stop S is move together with the third lens group G3.

In the optical system according to Example 1, focusing from infinity to a close object is carried out by moving the first lens group G1.

In the optical system according to Example 1, an image blur caused by a camera shake is corrected by shifting the third lens group G3 as a vibration reduction lens group in a direction perpendicular to the optical axis Various values associated with the optical system according to Example 1 are listed in Table 1.

In Table 1, f denotes a focal length, and Bf denotes a back focal length.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of a material at d-line (wavelength $\lambda=587.6$ nm), and the fifth column "vd" shows an Abbe number of the material at d-line (wavelength $\lambda=587.6$ nm). In the fourth column "nd" refractive index of the air nd=1.000000 is omitted. In the second column "r", $r=\infty$ denotes a plane surface. In the third column "d", Bf denotes a back focal length. The position of an aspherical surface is expressed by attaching "*" to the right side of the surface number.

In [Aspherical Data], an aspherical surface is exhibited by the following expression:

$$x=(h^2/r)/[1+[1-\kappa(h/r)^2]^{1/2}]+A4\times h^4+A6\times h^6+A8\times h^8+A10\times h^{10}$$

where h denotes a vertical height from the optical axis, x denotes a sag amount which is a distance along the optical axis from the tangent surface at the vertex of the aspherical surface to the aspherical surface at the vertical height h from the optical axis, r denotes a radius of curvature of a reference sphere (a paraxial radius of curvature), $\kappa$ denotes a conical coefficient, An denotes aspherical coefficient of n-th order, "E-n" denotes "$\times 10^{-n}$", for example, "1.234E-5" denotes "$1.234 \times 10^{-5}$".

In [Specifications], FNO denotes an f-number, $2\omega$ denotes an angle of view in degrees, Y denotes an image height, TL denotes a total lens length, W denotes a wide-angle end state, M denotes an intermediate focal length state, T denotes a telephoto end state.

In [Variable Distances], di denotes a variable distance at the surface number i where i is an integer, d0 denotes a distance between the object and the most object side lens surface.

In [Lens Group Data], a starting surface number "i" and a focal length of each lens group are shown. In [Values for Conditional Expressions], respective values with respect to conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

In an optical system having a focal length of f, a vibration reduction coefficient, which is a ratio of a moving amount of an image on the image plane to that of the moving lens group perpendicular to the optical axis upon correcting a camera shake, of $\kappa$, in order to correct rotational camera shake of an angle of $\theta$, the moving lens group for correcting the camera shake may be moved by the amount of $(f \cdot \tan \theta)/\kappa$ perpendicularly to the optical axis.

In the wide-angle end state of the optical system according to Example 1, the vibration reduction coefficient $\kappa$ is 1.08, and the focal length is 18.5 (mm), so that the moving amount of the third lens group G3 for correcting a rotational camera shake of 0.734 degrees is 0.219 (mm). In the telephoto end state, the vibration reduction coefficient $\kappa$ is 1.74, and the focal length is 53.4 (mm), so that the moving amount of the third lens group G3 for correcting a rotational camera shake of 0.432 degrees is 0.231 (mm).

TABLE 1

[Lens Data]

| i | r | d | nd | vd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −203.6563 | 1.50 | 1.62299 | 58.2 |
| 5 | 35.4686 | 1.10 | | |
| 6 | 29.5562 | 3.10 | 1.78472 | 25.7 |
| 7 | 74.7181 | d7 | | |
| 8 | 59.7272 | 0.90 | 1.84666 | 23.8 |
| 9 | 23.3566 | 4.30 | 1.51823 | 58.9 |

TABLE 1-continued

| | | | | |
|---|---|---|---|---|
| 10 | −28.6402 | 0.10 | | |
| 11 | 19.3966 | 1.80 | 1.51823 | 58.9 |
| 12 | 52.8204 | d12 | | |
| 13 | ∞ | 2.90 | Aperture Stop S | |
| 14 | −43.5025 | 2.75 | 1.94595 | 18.0 |
| 15 | −17.9969 | 0.80 | 1.85000 | 32.4 |
| 16 | 111.8314 | 5.50 | | |
| 17 | ∞ | d17 | Flare Stopper FS | |
| 18 | ∞ | 3.20 | 1.51742 | 52.3 |
| 19 | −23.6843 | 0.10 | | |
| 20 | 100.1845 | 5.70 | 1.49700 | 81.6 |
| 21 | −16.5860 | 1.30 | 1.85026 | 32.4 |
| 22 | −55.6622 | d22(Bf) | | |

[Aspherical Data]
Surface Number: 3

K = 1
A4 = 2.62050E−05
A6 = 5.94080E−08
A8 = −4.88100E−11
A10 = 7.61030E−13

| | W | M | T |
|---|---|---|---|
| [Specifications] Zoom Ratio: 2.886 | | | |
| f | 18.5 | 35.3 | 53.4 |
| FNO | 3.8 | 5.3 | 6.2 |
| 2ω | 77.4 | 43.5 | 29.3 |
| Y | 14.00 | 14.00 | 14.00 |
| TL | 131.3 | 125.6 | 136.8 |
| Bf | 38.1 | 55.1 | 73.7 |
| [Variable Distances] | | | |
| d7 | 32.30 | 9.65 | 2.18 |
| d12 | 2.71 | 8.06 | 12.30 |
| d17 | 11.04 | 5.69 | 1.46 |
| d22(Bf) | 38.1 | 55.1 | 73.7 |

[Lens Group Data]

| Group | i | focal length |
|---|---|---|
| 1 | 1 | −25.0 |
| 2 | 8 | 28.2 |
| 3 | 14 | −41.4 |
| 4 | 18 | 46.9 |

[Values for Conditional Expressions]

| | |
|---|---|
| (1): | nA(L31) = 1.94595 |
| | nA(L43) = 1.85026 |
| (2): | fA/fG(L31) = −0.74 |
| | fA/fG(L43) = −0.60 |
| (3): | νA(L31) = 18.0 |
| | νA(L43) = 32.4 |
| (4): | nA(L31) = 1.94595 |

Figure 2B:
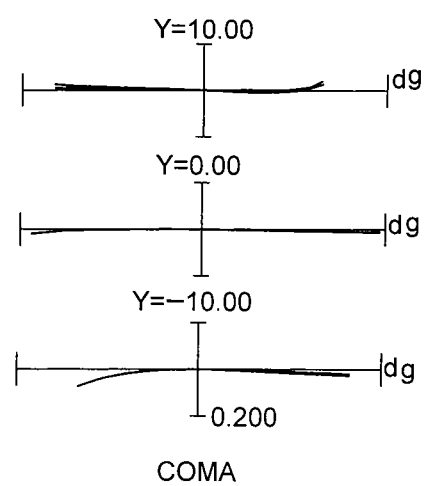

FIGS. 2A and 2B are graphs showing various aberrations of the optical system according to Example 1 in the wide-angle end state upon focusing on infinity, in which FIG. 2A shows various aberrations without performing vibration reduction, and FIG. 2B shows coma upon performing vibration reduction with respect to a rotational camera shake of 0.734 degrees.

Figure 3:
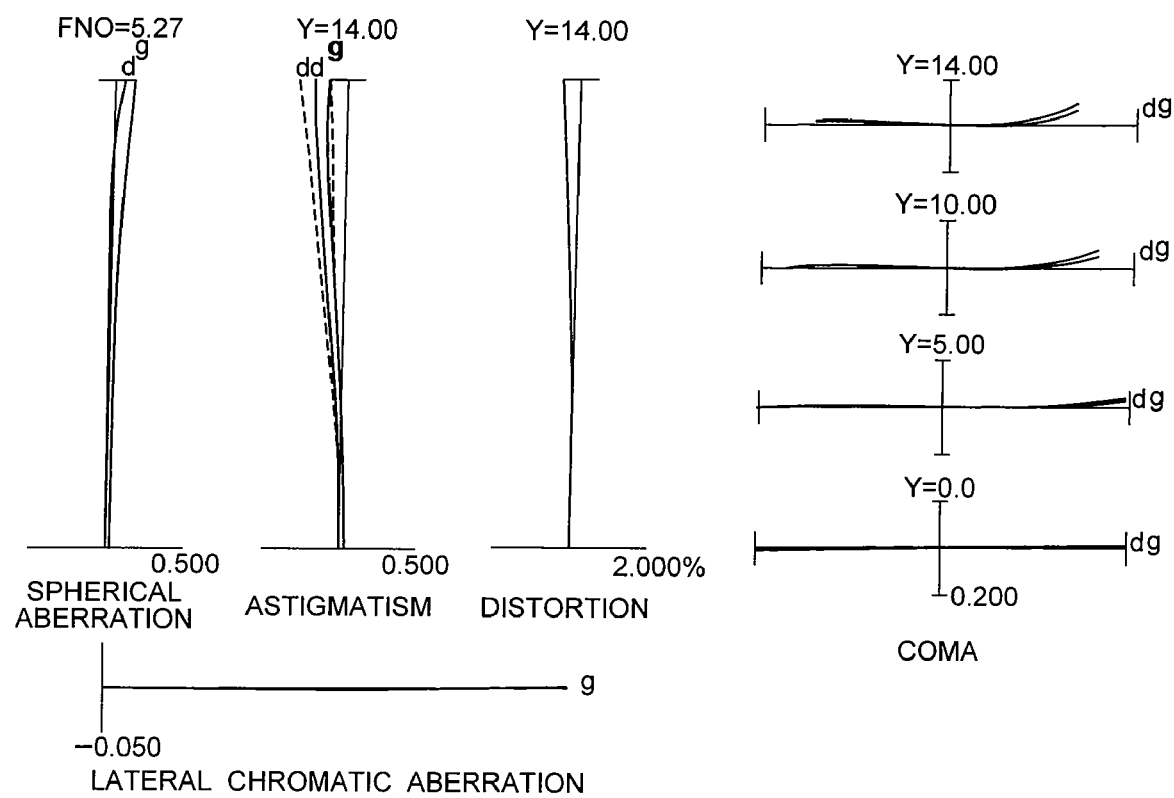
FIG. 3 is a graph showing various aberrations of the optical system according to Example 1 in an intermediate focal length state upon focusing on infinity.

FIG. 3 is a graph showing various aberrations of the optical system according to Example 1 in an intermediate focal length state upon focusing on infinity.

Figure 4A:
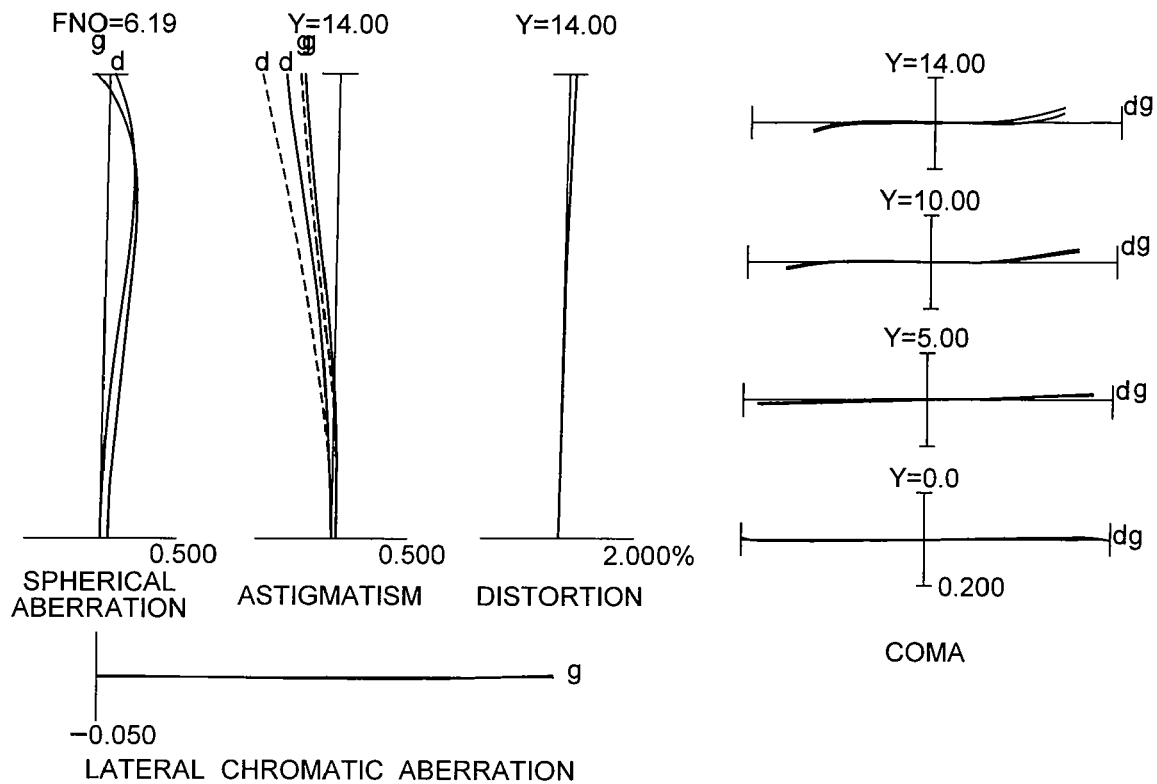
Figure 4B:
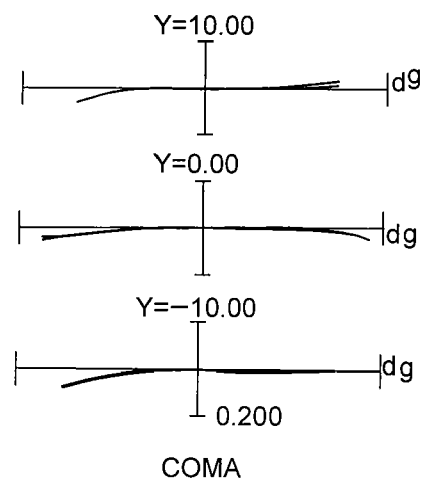

FIGS. 4A and 4B are graphs showing various aberrations of the optical system according to Example 1 in a telephoto end state upon focusing on infinity, in which FIG. 4A shows various aberrations without performing vibration reduction, and FIG. 4B shows coma upon performing vibration reduction with respect to a rotational camera shake of 0.432 degrees.

In respective graphs, FNO denotes an f-number, Y denotes an image height. In graphs showing spherical aberration, f-number with respect to the maximum aperture is shown. In graphs showing astigmatism and distortion, the maximum value of the image height is shown. In graphs showing coma, coma with respect to each image height is shown. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane. The above-described explanation regarding various aberration graphs is the same as the other Examples.

As is apparent from the respective graphs, the optical system according to Example 1 shows superb optical performance as a result of good corrections to various aberrations in the wide-angle end state, in the intermediate focal length state, and in the telephoto end state.

EXAMPLE 2

FIG. 5 is a sectional view showing a lens configuration of an optical system according to Example 2 of the present application in a wide-angle end state.

The optical system according to the present application is composed of, in order from the object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having convex surface facing the object. The negative meniscus lens L11 is an aspherical lens that a resin layer is applied on an image side glass surface and forming an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. As shown later in Table 2, the positive meniscus lens L31 satisfies the above-described conditional expressions (1), (2), (3) and (4) The fourth lens group G4 is composed of, in order from the object, a plano-convex lens L41 having a plane surface facing the object, and a cemented lens constructed by a double convex positive lens L42 cemented with a negative meniscus lens L43 having a convex surface facing an image.

In the optical system according to Example 2, an aperture stop S is disposed between the second lens group G2 and the third lens group G3. A flare stopper FS is disposed between the third lens group G3 and the fourth lens group G4.

In the optical system according to Example 2, upon varying a focal length from a wide-angle end state to a telephoto end state, the first lens group G1 is moved at first to the image and then to the object, the second lens group G2, the third lens group G3 and the fourth lens group G4 are moved to the object such that a distance between the second lens group G2 and the third lens group G3 increases, a distance between the third lens group G3 and the fourth lens group G4 decreases. In this case, the second lens group G2 and the fourth lens group G4 are moved in a body to the object. Upon varying a focal length from the wide-angle end state to the telephoto end state, the aperture stop S is move together with the third lens group G3.

In the optical system according to Example 2, focusing from infinity to a close object is carried out by moving the first lens group.

In the optical system according to Example 2, an image blur caused by a camera shake is corrected by shifting the third lens group G3 as a vibration reduction lens group in a direction perpendicular to the optical axis Various values associated with the optical system according to Example 2 are listed in Table 2.

In the wide-angle end state of the optical system according to Example 2, the vibration reduction coefficient κ is 1.05, and the focal length is 18.5 (mm), so that the moving amount of the third lens group G3 for correcting a rotational camera shake of 0.734 degrees is 0.226 (mm). In the telephoto end state, the vibration reduction coefficient κ is 1.67, and the focal length is 53.2 (mm), so that the moving amount of the third lens group G3 for correcting a rotational camera shake of 0.433 degrees is 0.242 (mm).

TABLE 2

[Lens Data]

| i | r | d | nd | vd |
|---|---|---|---|---|
| 1 | 115.5513 | 1.90 | 1.49782 | 82.6 |
| 2 | 15.6014 | 0.17 | 1.55389 | 38.1 |
| 3* | 13.3000 | 10.00 | | |
| 4 | −133.5569 | 1.50 | 1.62299 | 58.2 |
| 5 | 42.8613 | 1.10 | | |
| 6 | 31.7364 | 3.10 | 1.78472 | 25.7 |
| 7 | 69.7743 | d7 | | |
| 8 | 47.0699 | 0.90 | 1.84666 | 23.8 |
| 9 | 23.1680 | 4.30 | 1.51823 | 58.9 |
| 10 | −33.5773 | 0.10 | | |
| 11 | 21.1854 | 1.80 | 1.51823 | 58.9 |
| 12 | 68.7047 | d12 | | |
| 13 | ∞ | 2.90 | Aperture Stop S | |
| 14 | −28.6176 | 2.75 | 1.88300 | 40.8 |
| 15 | −16.0039 | 0.80 | 1.60300 | 65.5 |
| 16 | 60.5383 | 5.50 | | |
| 17 | ∞ | d17 | Flare Stopper FS | |
| 18 | ∞ | 3.20 | 1.51742 | 52.3 |
| 19 | −29.7894 | 0.10 | | |
| 20 | 87.8028 | 5.70 | 1.52249 | 59.7 |
| 21 | −17.2520 | 1.30 | 1.85026 | 32.4 |
| 22 | −54.2138 | d22(Bf) | | |

[Aspherical Data]
Surface Number: 3

K = 1
A4 = 2.62050E−05
A6 = 5.94080E−08
A8 = −4.88100E−11
A10 = 7.61030E−13

| | W | M | T |
|---|---|---|---|

[Specifications]
Zoom Ratio: 2.886

| | | | |
|---|---|---|---|
| f | 18.5 | 35.4 | 53.4 |
| FNO | 3.6 | 5.3 | 5.8 |
| 2ω | 77.4 | 43.5 | 29.4 |
| Y | 14.00 | 14.00 | 14.00 |
| TL | 131.7 | 126.6 | 138.2 |
| BF | 38.1 | 55.7 | 74.7 |

TABLE 2-continued

[Variable Distances]

| | | | |
|---|---|---|---|
| d7 | 32.66 | 10.01 | 2.53 |
| d12 | 2.36 | 7.71 | 11.94 |
| d17 | 11.42 | 6.06 | 1.83 |
| d22(Bf) | 38.1 | 55.7 | 74.7 |

[Lens Group Data]

| Group | i | focal length |
|---|---|---|
| 1 | 1 | −24.6 |
| 2 | 8 | 27.8 |
| 3 | 14 | −43.4 |
| 4 | 18 | 49.4 |

[Values for Conditional Expressions]

| | |
|---|---|
| (1): | nA(L31) = 1.88300 |
| | nA(L43) = 1.85026 |
| (2): | fA/fG(L31) = −0.86 |
| | fA/fG(L43) = −0.61 |
| (3): | νA(L31) = 40.8 |
| | νA(L43) = 32.4 |
| (4): | nA(L31) = 1.88300 |

Figure 6A:
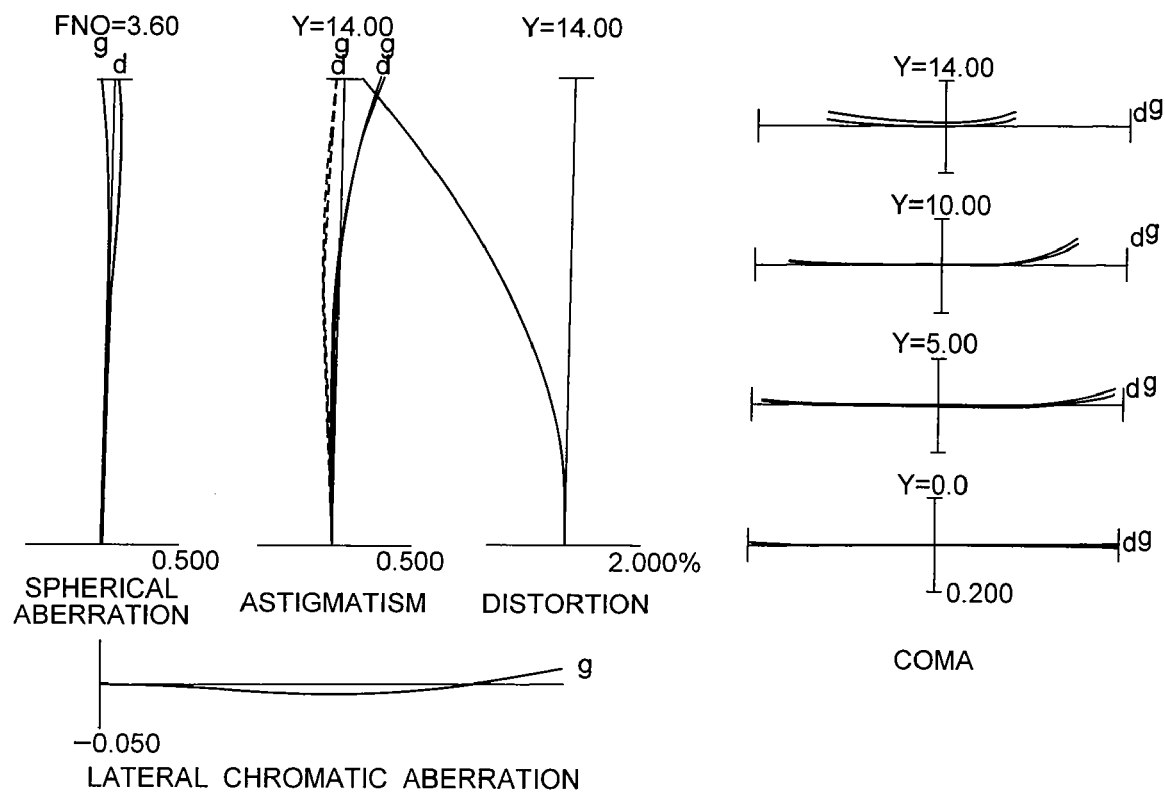
Figure 6B:
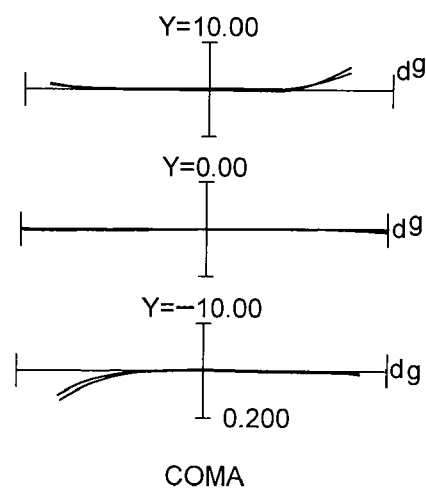

FIGS. 6A and 6B are graphs showing various aberrations of the optical system according to Example 2 in the wide-angle end state upon focusing on infinity, in which FIG. 6A shows various aberrations without performing vibration reduction, and FIG. 6B shows coma upon performing vibration reduction with respect to a rotational camera shake of 0.734 degrees.

Figure 7:
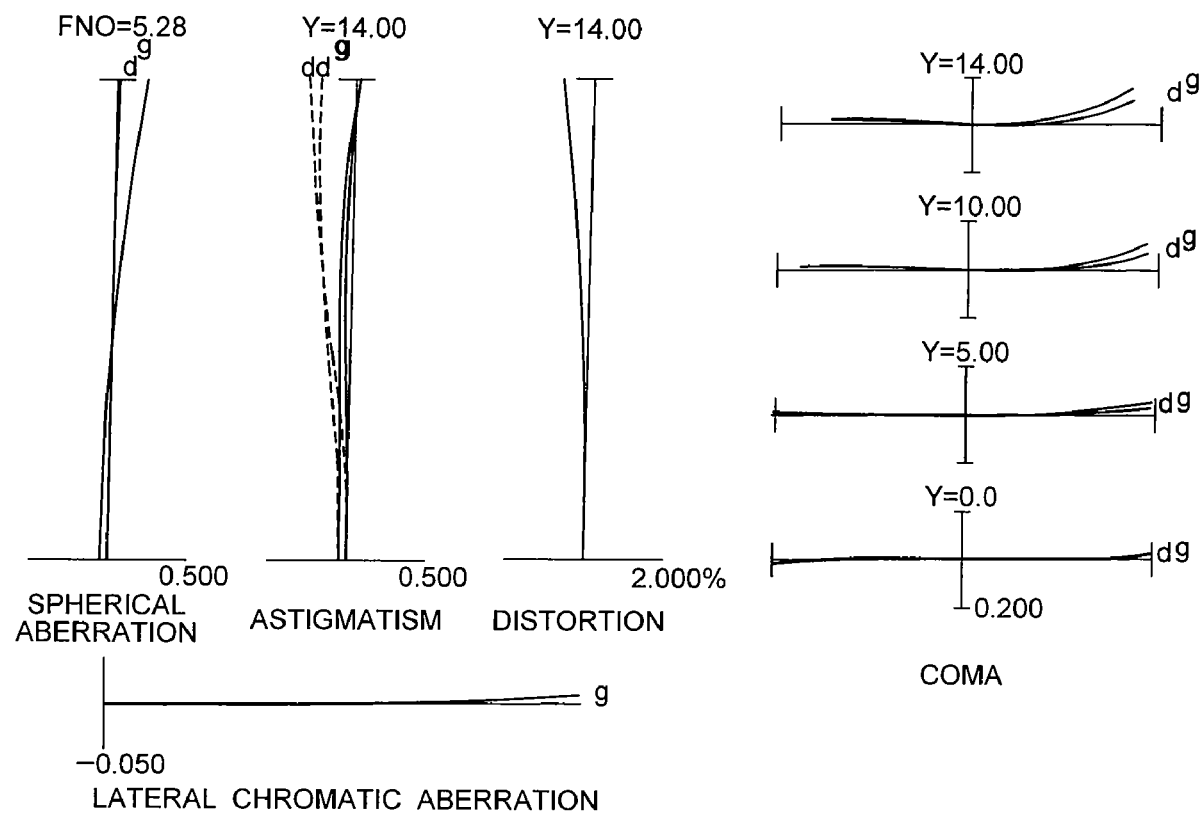
FIG. 7 is a graph showing various aberrations of the optical system according to Example 2 in an intermediate focal length state upon focusing on infinity.

FIG. 7 is a graph showing various aberrations of the optical system according to Example 2 in an intermediate focal length state upon focusing on infinity.

Figure 8A:
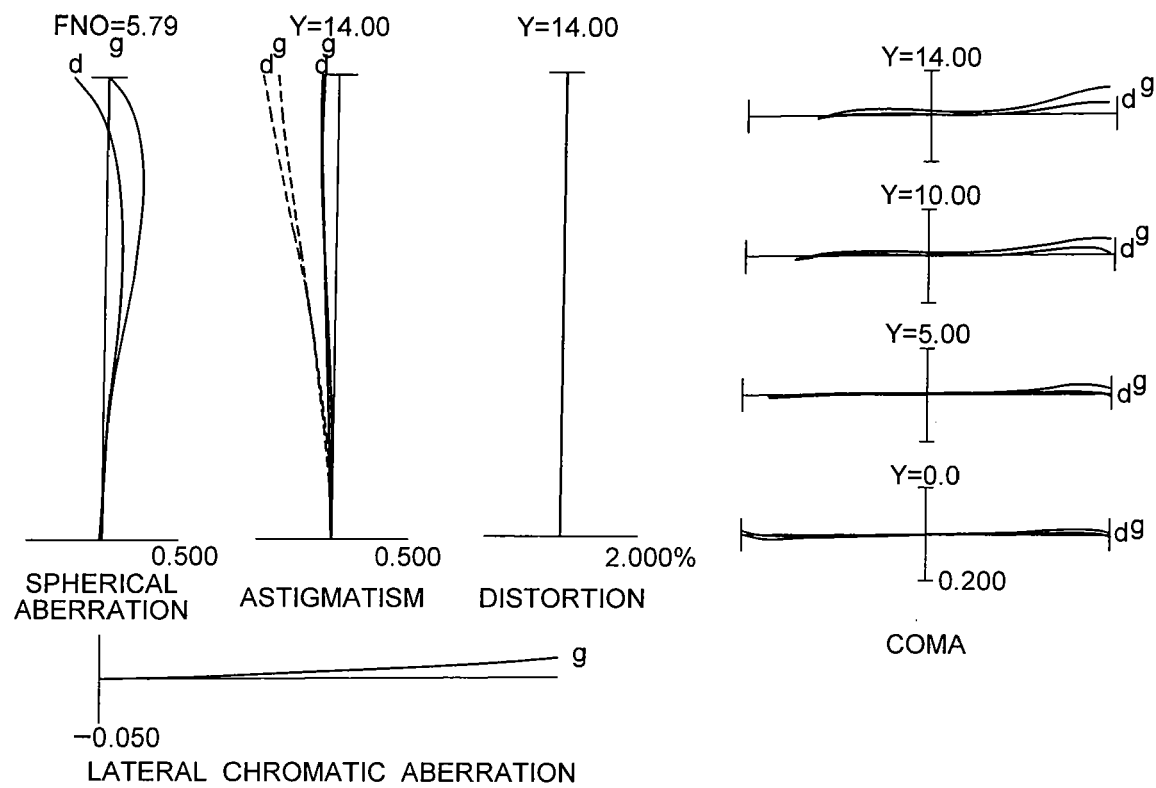
Figure 8B:
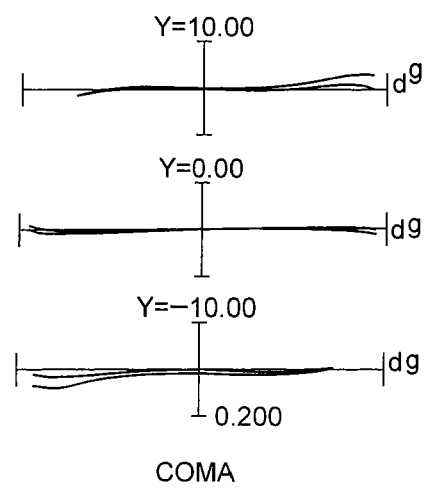

FIGS. 8A and 8B are graphs showing various aberrations of the optical system according to Example 2 in a telephoto end state upon focusing on infinity, in which FIG. 8A shows various aberrations without performing vibration reduction, and FIG. 8B shows coma upon performing vibration reduction with respect to a rotational camera shake of 0.43 degrees.

As is apparent from the respective graphs, the optical system according to Example 2 shows superb optical performance as a result of good corrections to various aberrations in the wide-angle end state, in the intermediate focal length state, and in the telephoto end state.

EXAMPLE 3

Figure 9:
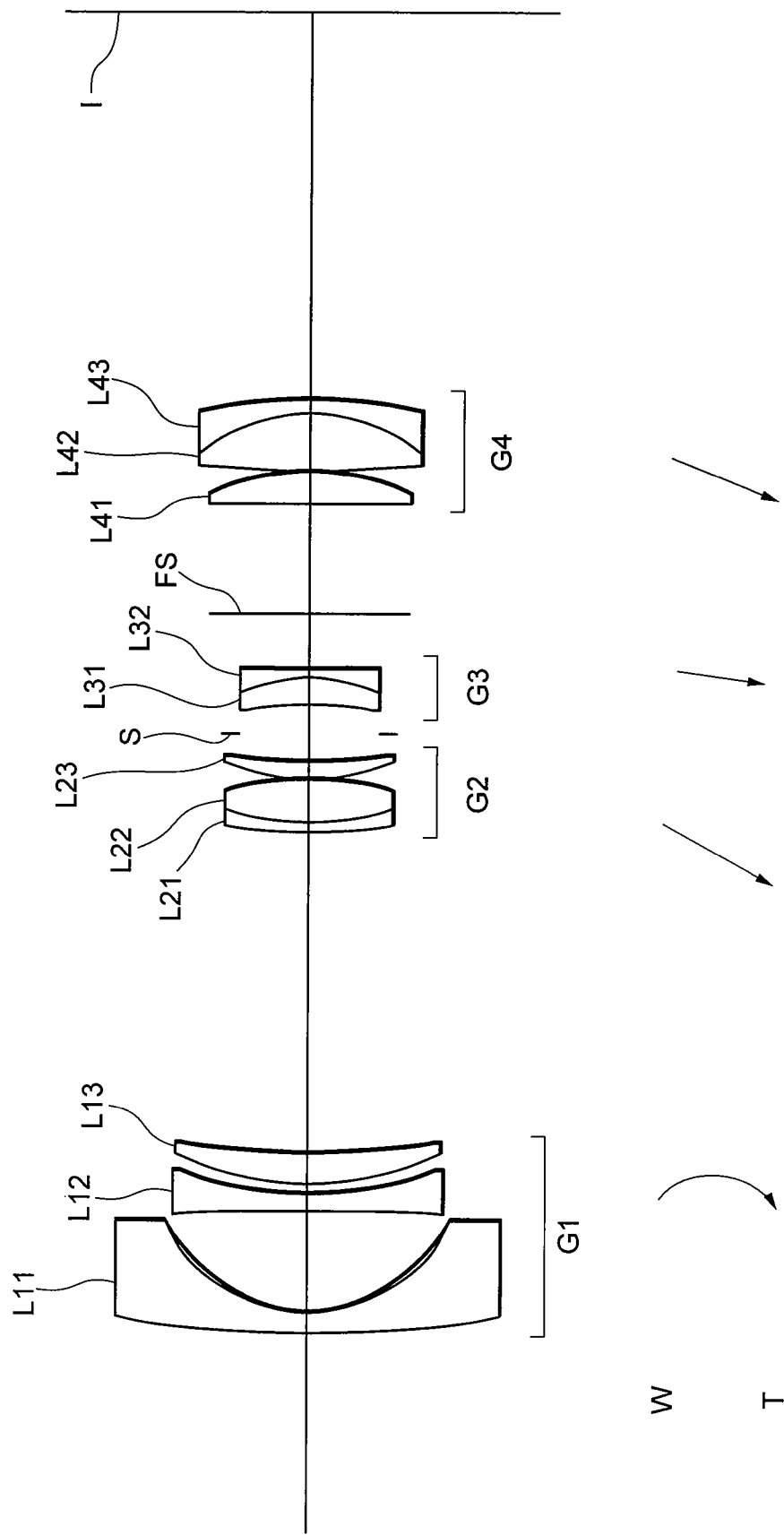
FIG. 9 is a sectional view showing a lens configuration of an optical system according to Example 3 of the present application in a wide-angle end state.

FIG. 9 is a sectional view showing a lens configuration of an optical system according to Example 3 of the present application in a wide-angle end state.

The optical system according to the present application is composed of, in order from the object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having convex surface facing the object. The negative meniscus lens L11 is an aspherical lens that a resin layer is applied on an image side glass surface and forming an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. As shown later in Table 3, the positive meniscus lens L31 satisfies the above-described conditional expressions (1), (2), (3) and (4).

The fourth lens group G4 is composed of, in order from the object, a plano-convex lens L41 having a plane surface facing the object, and a cemented lens constructed by a double convex positive lens L42 cemented with a negative meniscus lens L43 having a convex surface facing an image.

In the optical system according to Example 3, an aperture stop S is disposed between the second lens group G2 and the third lens group G3. A flare stopper FS is disposed between the third lens group G3 and the fourth lens group G4.

In the optical system according to Example 3, upon varying a focal length from a wide-angle end state to a telephoto end state, the first lens group G1 is moved at first to the image and then to the object, the second lens group G2, the third lens group G3 and the fourth lens group G4 are moved to the object such that a distance between the second lens group G2 and the third lens group G3 increases, a distance between the third lens group G3 and the fourth lens group G4 decreases. In this case, the second lens group G2 and the fourth lens group G4 are moved in a body to the object. Upon varying a focal length from the wide-angle end state to the telephoto end state, the aperture stop S is move together with the third lens group G3.

In the optical system according to Example 3, focusing from infinity to a close object is carried out by moving the first lens group.

In the optical system according to Example 3, an image blur caused by a camera shake is corrected by shifting the third lens group G3 as a vibration reduction lens group in a direction perpendicular to the optical axis Various values associated with the optical system according to Example 3 are listed in Table 3.

In the wide-angle end state of the optical system according to Example 3, the vibration reduction coefficient κ is 1.08, and the focal length is 18.5 (mm), so that the moving amount of the third lens group G3 for correcting a rotational camera shake of 0.734 degrees is 0.219 (mm). In the telephoto end state, the vibration reduction coefficient κ is 1.74, and the focal length is 53.4 (mm), so that the moving amount of the third lens group G3 for correcting a rotational camera shake of 0.432 degrees is 0.231 (mm).

TABLE 3

[Lens Data]

| i | r | d | nd | νd |
|---|---|---|----|----|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −180.3836 | 1.50 | 1.62299 | 58.2 |
| 5 | 36.7979 | 1.10 | | |
| 6 | 29.8103 | 3.10 | 1.78472 | 25.7 |
| 7 | 74.7181 | d7 | | |
| 8 | 50.5666 | 0.90 | 1.84666 | 23.8 |
| 9 | 21.7186 | 4.30 | 1.51823 | 58.9 |
| 10 | −29.0198 | 0.10 | | |
| 11 | 19.2917 | 1.80 | 1.51823 | 58.9 |
| 12 | 46.5501 | d12 | | |
| 13 | ∞ | 2.90 | Aperture Stop S | |
| 14 | −40.1312 | 2.75 | 2.00170 | 20.7 |
| 15 | −15.5486 | 0.80 | 1.89800 | 34.0 |

TABLE 3-continued

| 16 | 152.9489 | 5.50 | | |
|----|----------|------|---|---|
| 17 | ∞ | d17 | Flare Stopper FS | |
| 18 | ∞ | 3.20 | 1.51742 | 52.3 |
| 19 | −23.8646 | 0.10 | | |
| 20 | 101.1522 | 5.70 | 1.49700 | 81.6 |
| 21 | −16.5227 | 1.30 | 1.85026 | 32.4 |
| 22 | −54.1237 | Bf | | |

[Aspherical Data]
Surface Number: 3

K = 1
A4 = 2.62050E−05
A6 = 5.94080E−08
A8 = −4.88100E−11
A10 = 7.61030E−13

| | W | M | T |
|---|---|---|---|
| [Specifications] | | | |
| Zoom Ratio: 2.886 | | | |
| f | 18.5 | 35.3 | 53.4 |
| FNO | 3.6 | 5.2 | 6.0 |
| 2ω | 77.3 | 43.5 | 29.3 |
| Y | 14.00 | 14.00 | 14.00 |
| TL | 131.3 | 125.7 | 136.9 |
| BF | 38.1 | 55.2 | 73.9 |
| [Variable Distances] | | | |
| d7 | 32.30 | 10.01 | 2.53 |
| d12 | 2.36 | 7.71 | 11.94 |
| d17 | 11.04 | 6.06 | 1.83 |
| d22(Bf) | 38.1 | 55.2 | 73.9 |

[Lens Group Data]

| Group | i | focal length |
|-------|---|--------------|
| 1 | 1 | −25.0 |
| 2 | 8 | 28.2 |
| 3 | 14 | −41.4 |
| 4 | 18 | 46.7 |

[Values for Conditional Expressions]

| (1): | nA(L31) = 2.00170 |
| | nA(L32) = 1.89800 |
| | nA(L43) = 1.85026 |
| (2): | fA/fG(L31) = −0.58 |
| | fA/fG(L32) = 0.38 |
| | fA/fG(L43) = −0.61 |
| (3): | νA(L31) = 20.7 |
| | νA(L32) = 34.0 |
| | νA(L43) = 32.4 |
| (4): | nA(L31) = 2.00170 |

Figure 10A:
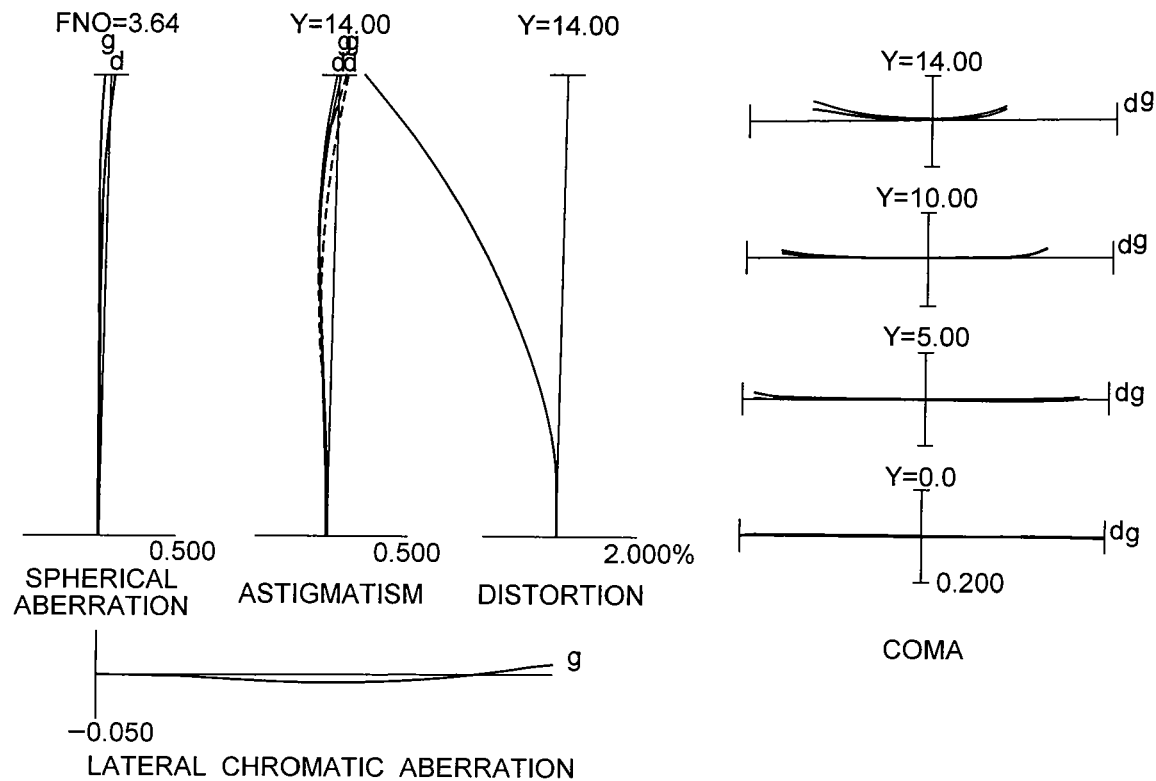
Figure 10B:
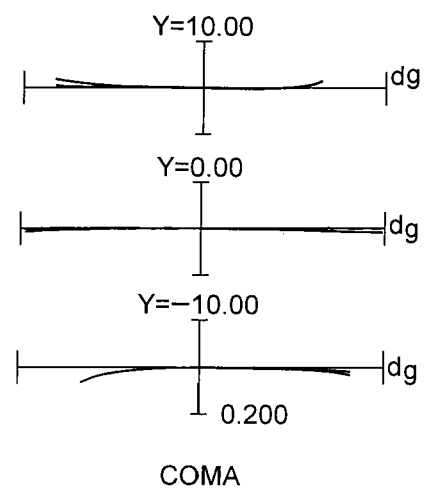

FIGS. 10A and 10B are graphs showing various aberrations of the optical system according to Example 3 in the wide-angle end state upon focusing on infinity, in which FIG. 10A shows various aberrations without performing vibration reduction, and FIG. 10B shows coma upon performing vibration reduction with respect to a rotational camera shake of 0.734 degrees.

Figure 11:
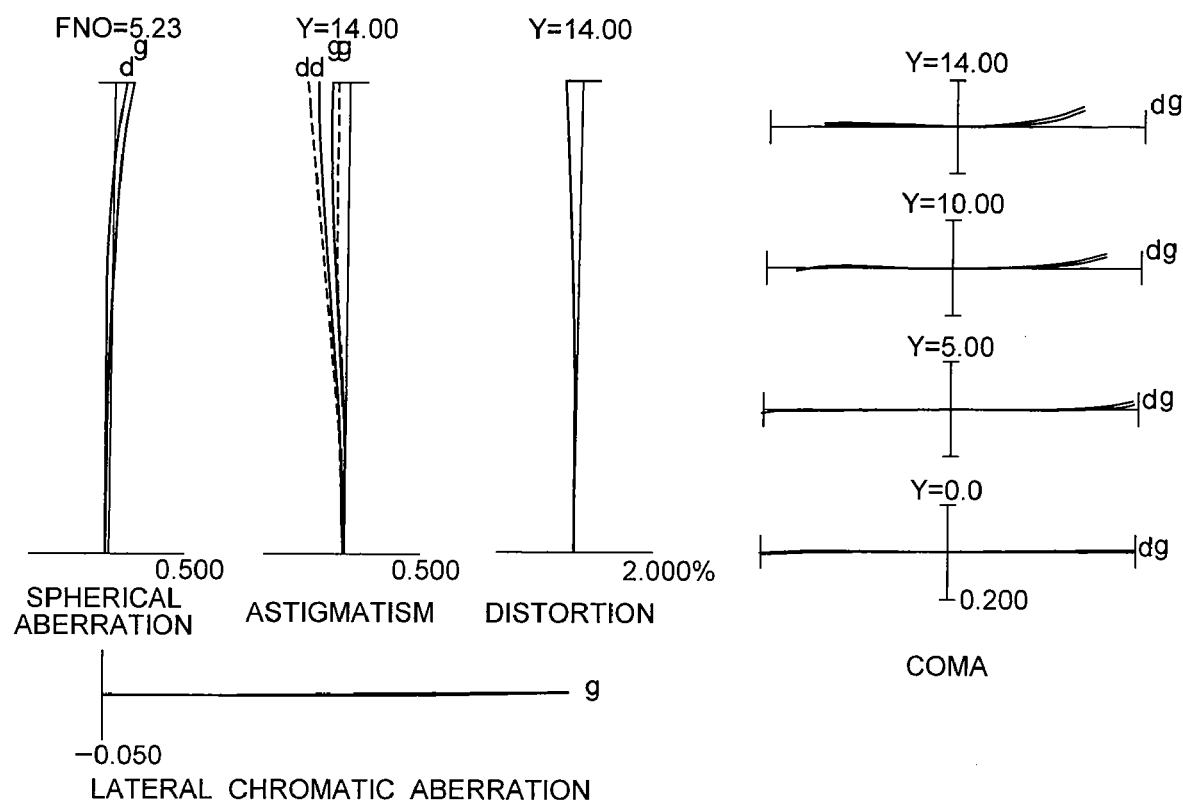
FIG. 11 is a graph showing various aberrations of the optical system according to Example 3 in an intermediate focal length state upon focusing on infinity.

FIG. 11 is a graph showing various aberrations of the optical system according to Example 3 in an intermediate focal length state upon focusing on infinity.

Figure 12A:
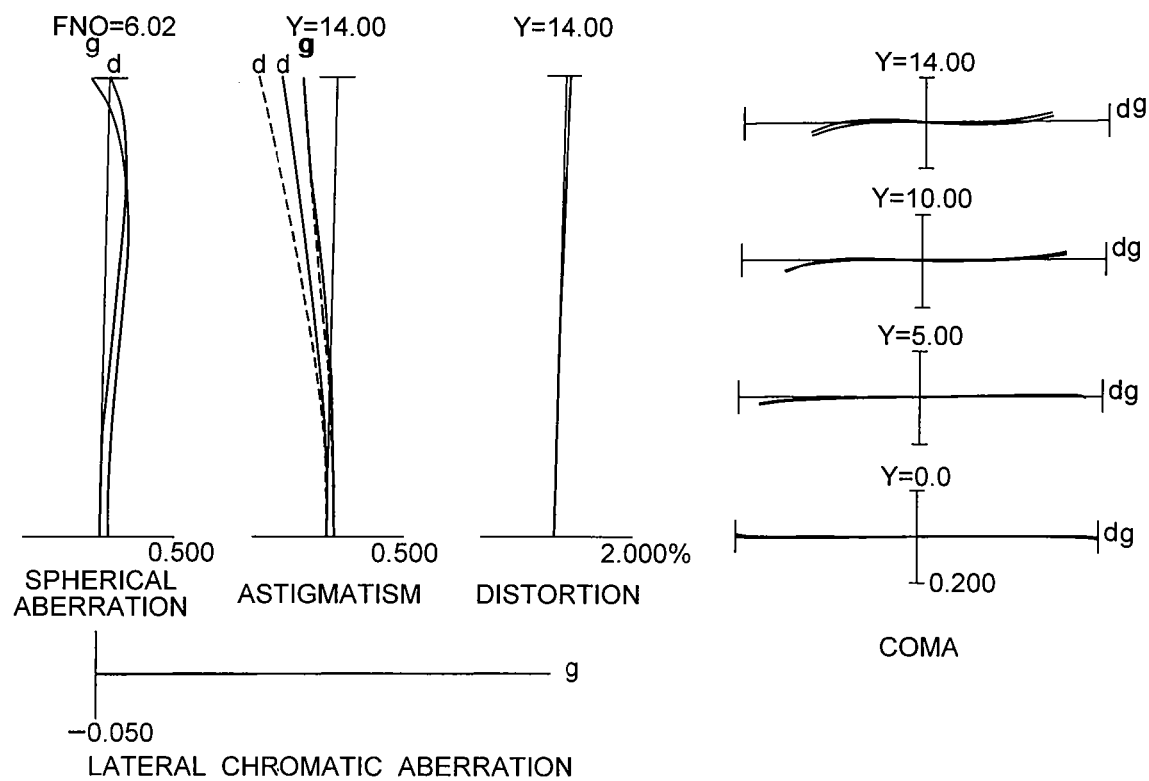
Figure 12B:
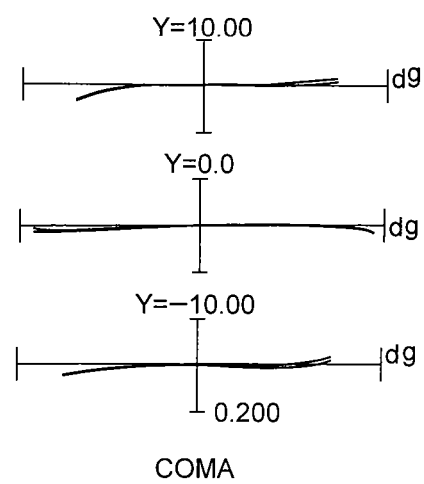

FIGS. 12A and 12B are graphs showing various aberrations of the optical system according to Example 3 in a telephoto end state upon focusing on infinity, in which FIG. 12A shows various aberrations without performing vibration reduction, and FIG. 12B shows coma upon performing vibration reduction with respect to a rotational camera shake of 0.432 degrees.

As is apparent from the respective graphs, the optical system according to Example 3 shows superb optical performance as a result of good corrections to various aberrations in the wide-angle end state, in the intermediate focal length state, and in the telephoto end state.

EXAMPLE 4

FIG. 13 is a sectional view showing a lens configuration of an optical system according to Example 4 of the present application in a wide-angle end state.

The optical system according to the present application is composed of, in order from the object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having convex surface facing the object. The negative meniscus lens L11 is an aspherical lens that a resin layer is applied on an image side glass surface and forming an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. As shown later in Table 4, the positive meniscus lens L31 satisfies the above-described conditional expressions (1), (2), (3) and (4).

The fourth lens group G4 is composed of, in order from the object, a plano-convex lens L41 having a plane surface facing the object, and a cemented lens constructed by a double convex positive lens L42 cemented with a negative meniscus lens L43 having a convex surface facing an image.

In the optical system according to Example 4, an aperture stop S is disposed between the second lens group G2 and the third lens group G3. A flare stopper FS is disposed between the third lens group G3 and the fourth lens group G4.

In the optical system according to Example 4, upon varying a focal length from a wide-angle end state to a telephoto end state, the first lens group G1 is moved at first to the image and then to the object, the second lens group G2, the third lens group G3 and the fourth lens group G4 are moved to the object such that a distance between the second lens group G2 and the third lens group G3 increases, a distance between the third lens group G3 and the fourth lens group G4 decreases. In this case, the second lens group G2 and the fourth lens group G4 are moved in a body to the object. Upon varying a focal length from the wide-angle end state to the telephoto end state, the aperture stop S is move together with the third lens group G3.

In the optical system according to Example 4, focusing from infinity to a close object is carried out by moving the first lens group.

In the optical system according to Example 4, an image blur caused by a camera shake is corrected by shifting the third lens group G3 as a vibration reduction lens group in a direction perpendicular to the optical axis Various values associated with the optical system according to Example 4 are listed in Table 4.

In the wide-angle end state of the optical system according to Example 4, the vibration reduction coefficient κ is 1.05, and the focal length is 18.5 (mm), so that the moving amount of the third lens group G3 for correcting a rotational camera shake of 0.734 degrees is 0.226 (mm). In the telephoto end state, the vibration reduction coefficient κ is 1.70, and the focal length is 53.4 (mm), so that the moving amount of the third lens group G3 for correcting a rotational camera shake of 0.432 degrees is 0.237 (mm).

TABLE 4

[Lens Data]

| i | r | d | nd | vd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −248.6179 | 1.50 | 1.62299 | 58.2 |
| 5 | 34.6127 | 1.10 | | |
| 6 | 29.6569 | 3.10 | 1.78472 | 25.7 |
| 7 | 74.7181 | d7 | | |
| 8 | 53.9942 | 0.90 | 1.84666 | 23.8 |
| 9 | 22.5667 | 4.30 | 1.51823 | 58.9 |
| 10 | −29.5941 | 0.10 | | |
| 11 | 19.0339 | 1.80 | 1.51823 | 58.9 |
| 12 | 47.2870 | d12 | | |
| 13 | ∞ | 2.90 | Aperture Stop S | |
| 14 | −43.2107 | 2.75 | 2.14352 | 17.8 |
| 15 | −17.4145 | 0.80 | 2.00330 | 28.3 |
| 16 | 198.6809 | 5.50 | | |
| 17 | ∞ | d17 | Flare Stopper FS | |
| 18 | 0.0000 | 3.20 | 1.51742 | 52.3 |
| 19 | −24.5210 | 0.10 | | |
| 20 | 90.7179 | 5.70 | 1.49700 | 81.6 |
| 21 | −16.6300 | 1.30 | 1.85026 | 32.4 |
| 22 | −55.9527 | d22(Bf) | | |

[Aspherical Data]
Surface Number: 3

K = 1
A4 = 2.59680E−05
A6 = 5.34430E−08
A8 = −7.40590E−11
A10 = 7.61030E−13

| | W | M | T |
|---|---|---|---|
| | [Specifications] | | |
| | Zoom Ratio: 2.886 | | |
| f | 18.5 | 35.3 | 53.4 |
| FNO | 3.7 | 5.3 | 6.0 |
| 2ω | 77.0 | 43.5 | 29.4 |
| Y | 14.25 | 14.25 | 14.25 |
| TL | 131.3 | 125.9 | 137.2 |
| BF | 38.1 | 55.4 | 74.2 |
| | [Variable Distances] | | |
| d7 | 32.30 | 9.65 | 2.18 |
| d12 | 2.71 | 8.06 | 12.30 |
| d17 | 11.04 | 5.69 | 1.46 |
| d22(Bf) | 38.1 | 55.4 | 74.2 |

[Lens Group Data]

| Group | i | focal length |
|---|---|---|
| 1 | 1 | −25.0 |
| 2 | 8 | 28.4 |
| 3 | 14 | −42.7 |
| 4 | 18 | 47.5 |

[Values for Conditional Expressions]

(1): nA(L31) = 2.14352
nA(L32) = 2.00330
nA(L43) = 1.85026
(2): fA/fG(L31) = −0.56
fA/fG(L32) = 0.37
fA/fG(L43) = −0.60

TABLE 4-continued

| | |
|---|---|
| (3): | νA(L31) = 17.8 |
| | νA(L32) = 28.3 |
| | νA(L43) = 32.4 |
| (4): | nA(L31) = 2.14352 |

Figure 14A:
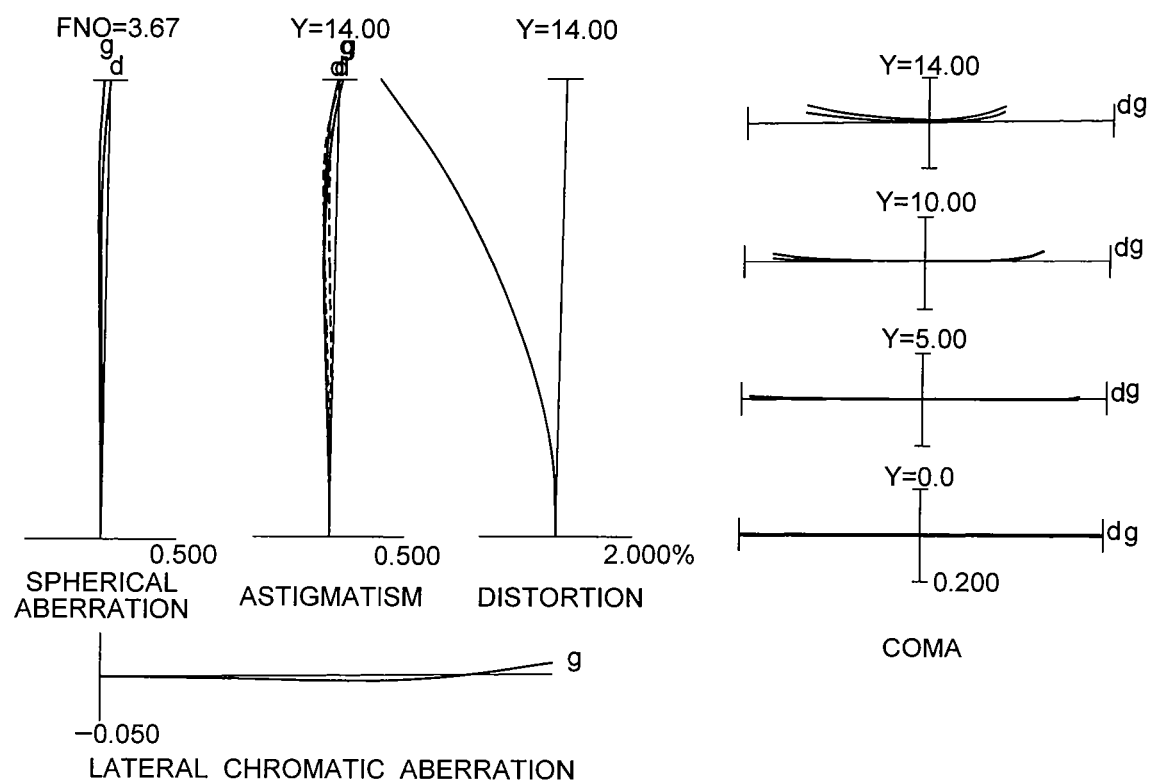
Figure 14B:
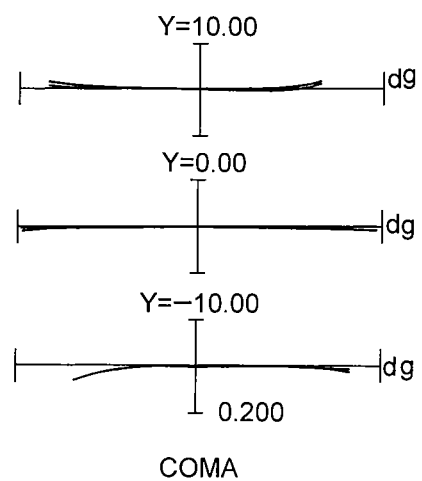

FIGS. 14A and 14B are graphs showing various aberrations of the optical system according to Example 4 in the wide-angle end state upon focusing on infinity, in which FIG. 14A shows various aberrations without performing vibration reduction, and FIG. 14B shows coma upon performing vibration reduction with respect to a rotational camera shake of 0.734 degrees.

Figure 15:
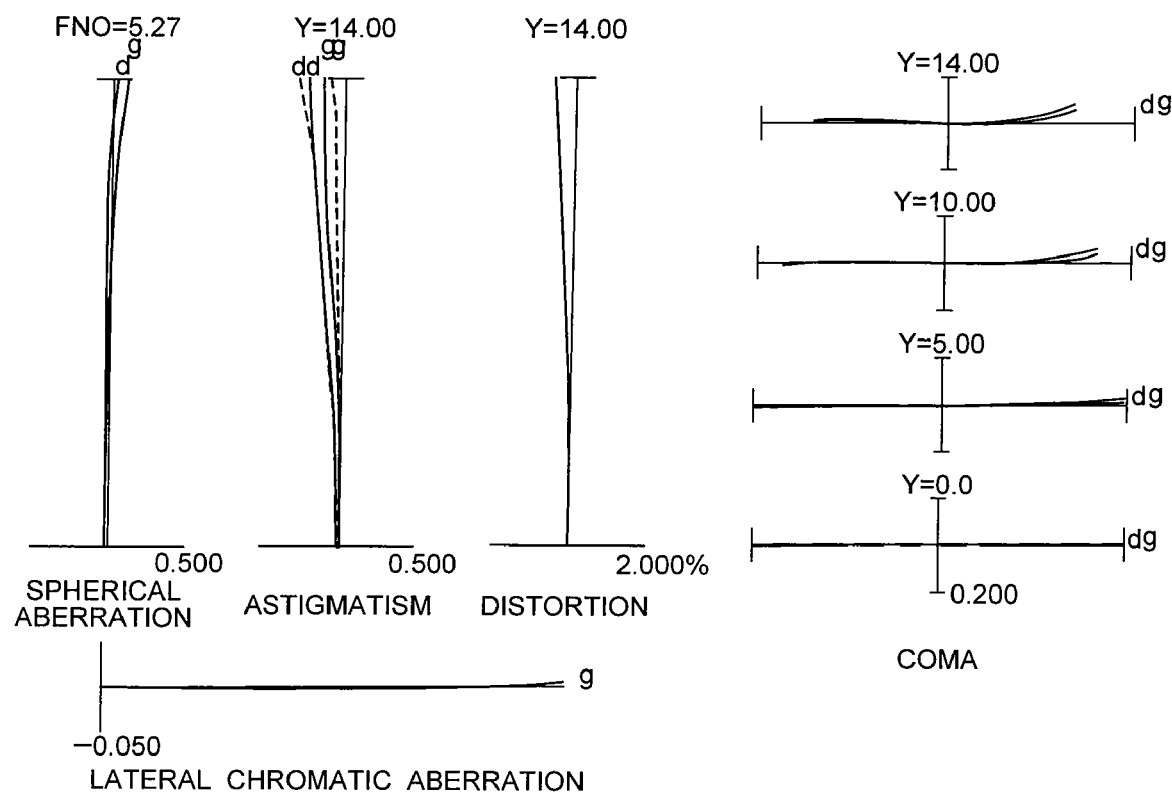
FIG. 15 is a graph showing various aberrations of the optical system according to Example 4 in an intermediate focal length state upon focusing on infinity.

FIG. 15 is a graph showing various aberrations of the optical system according to Example 4 in an intermediate focal length state upon focusing on infinity.

Figure 16A:
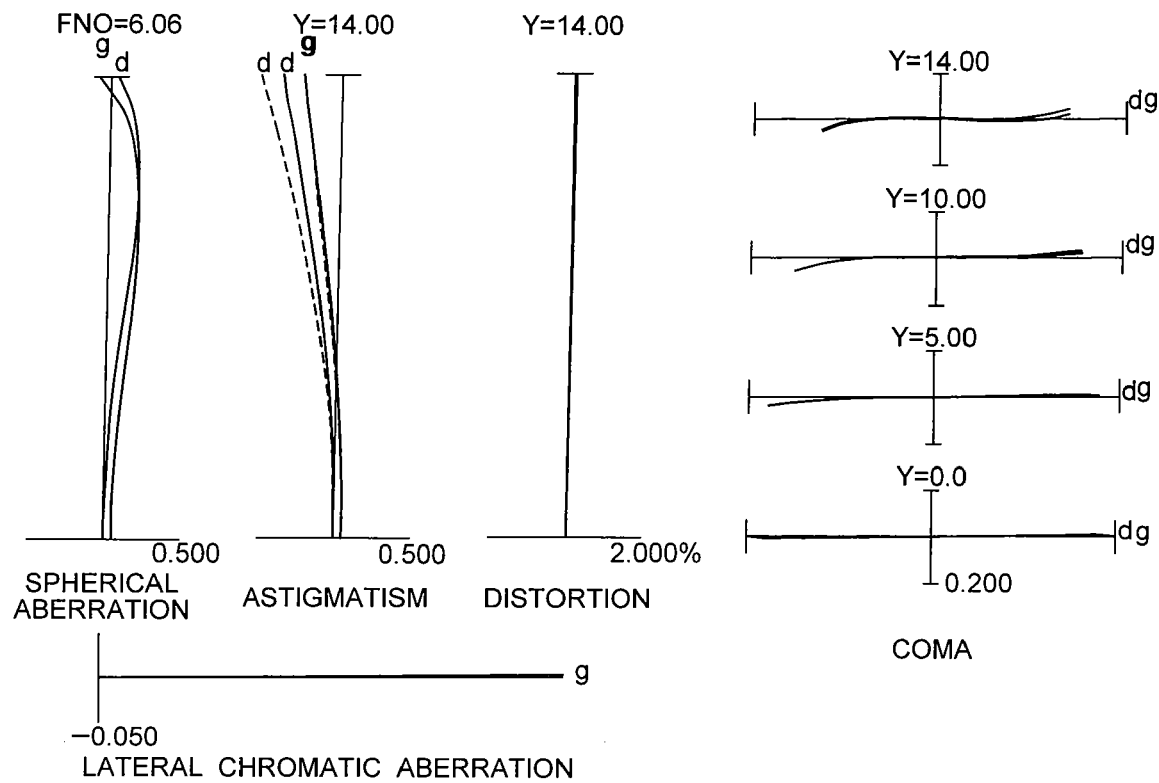
Figure 16B:
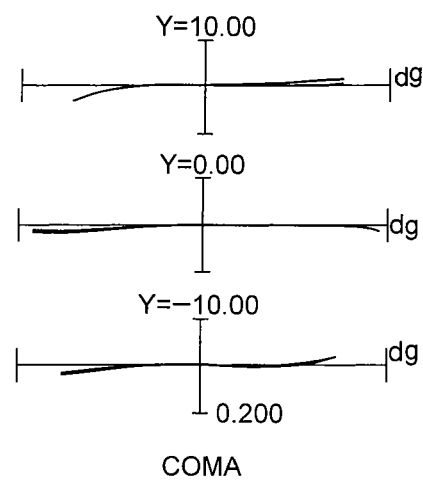

FIGS. 16A and 16B are graphs showing various aberrations of the optical system according to Example 4 in a telephoto end state upon focusing on infinity, in which FIG. 16A shows various aberrations without performing vibration reduction, and FIG. 16B shows coma upon performing vibration reduction with respect to a rotational camera shake of 0.432 degrees.

As is apparent from the respective graphs, the optical system according to Example 4 shows superb optical performance as a result of good corrections to various aberrations in the wide-angle end state, in the intermediate focal length state, and in the telephoto end state.

EXAMPLE 5

Figure 17:
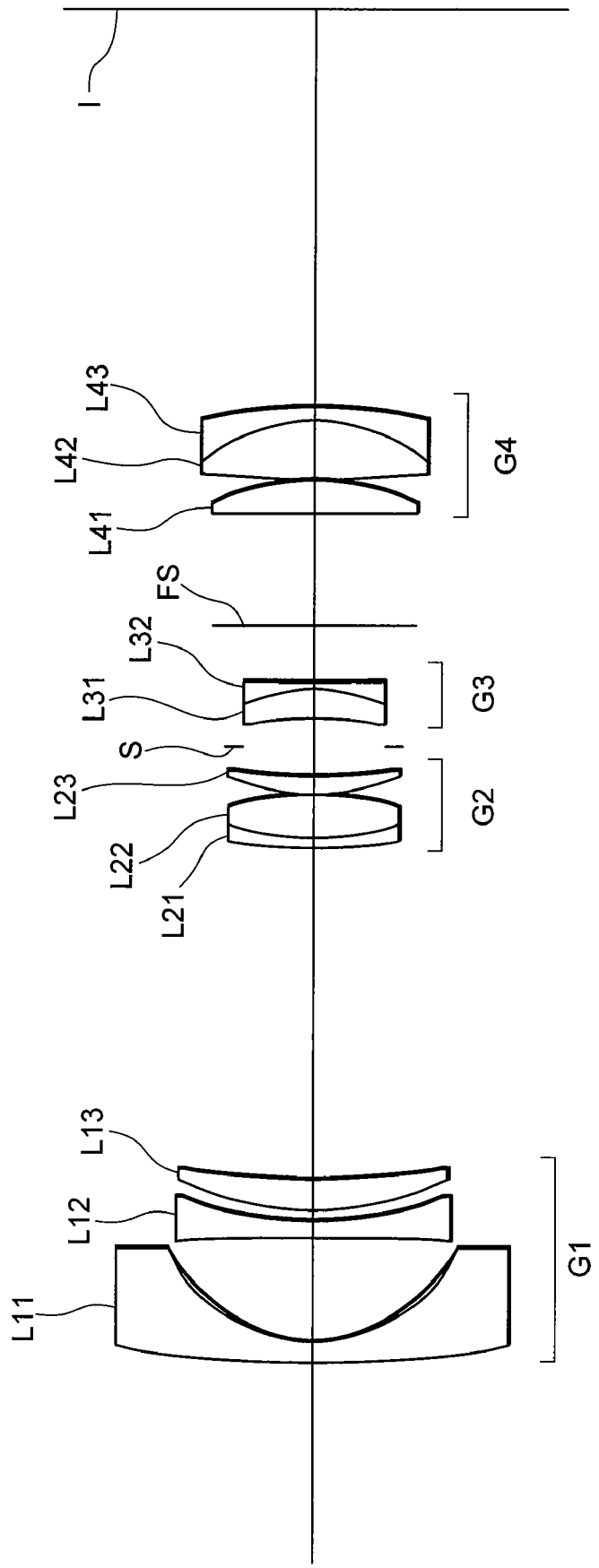
FIG. 17 is a sectional view showing a lens configuration of an optical system according to Example 5 of the present application.

FIG. 17 is a sectional view showing a lens configuration of an optical system according to Example 5 of the present application.

The optical system according to the present application is composed of, in order from the object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having convex surface facing the object. The negative meniscus lens L11 is an aspherical lens that a resin layer is applied on an image side glass surface and forming an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. As shown later in Table 5, the positive meniscus lens L31 satisfies the above-described conditional expressions (1), (2), (3) and (4).

The fourth lens group G4 is composed of, in order from the object, a plano-convex lens L41 having a plane surface facing the object, and a cemented lens constructed by a double convex positive lens L42 cemented with a negative meniscus lens L43 having a convex surface facing an image.

In the optical system according to Example 5, an aperture stop S is disposed between the second lens group G2 and the third lens group G3. A flare stopper FS is disposed between the third lens group G3 and the fourth lens group G4.

In the optical system according to Example 5, upon varying a focal length from a wide-angle end state to a telephoto end state, the first lens group G1 is moved at first to the image and then to the object, the second lens group G2, the third lens group G3 and the fourth lens group G4 are moved to the object such that a distance between the second lens group G2 and the third lens group G3 increases, a distance between the third lens group G3 and the fourth lens group G4 decreases. In this case, the second lens group G2 and the fourth lens group G4 are moved in a body to the object. Upon varying a focal length from the wide-angle end state to the telephoto end state, the aperture stop S is move together with the third lens group G3.

In the optical system according to Example 5, focusing from infinity to a close object is carried out by moving the first lens group.

In the optical system according to Example 5, an image blur caused by a camera shake is corrected by shifting the third lens group G3 as a vibration reduction lens group in a direction perpendicular to the optical axis Various values associated with the optical system according to Example 5 are listed in Table 5.

In the wide-angle end state of the optical system according to Example 5, the vibration reduction coefficient κ is 1.05, and the focal length is 18.5 (mm), so that the moving amount of the third lens group G3 for correcting a rotational camera shake of 0.734 degrees is 0.226 (mm). In the telephoto end state, the vibration reduction coefficient κ is 1.70, and the focal length is 53.4 (mm), so that the moving amount of the third lens group G3 for correcting a rotational camera shake of 0.432 degrees is 0.237 (mm).

TABLE 5

[Lens Data]

| i | r | d | nd | νd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −203.6563 | 1.50 | 1.62299 | 58.2 |
| 5 | 35.4686 | 1.10 | | |
| 6 | 29.5562 | 3.10 | 1.78472 | 25.7 |
| 7 | 74.7181 | 32.30 | | |
| 8 | 59.7272 | 0.90 | 1.84666 | 23.8 |
| 9 | 23.3566 | 4.30 | 1.51823 | 58.9 |
| 10 | −28.6402 | 0.10 | | |
| 11 | 19.3966 | 1.80 | 1.51823 | 58.9 |
| 12 | 52.8204 | 2.71 | | |
| 13 | ∞ | 2.90 | Aperture Stop S | |
| 14 | −43.5025 | 2.75 | 1.94595 | 18.0 |
| 15 | −17.9969 | 0.80 | 1.85000 | 32.4 |
| 16 | 111.8314 | 5.50 | | |
| 17 | ∞ | 11.04 | Flare Stopper FS | |
| 18 | ∞ | 3.20 | 1.51742 | 52.3 |
| 19 | −23.6843 | 0.10 | | |
| 20 | 100.1845 | 5.70 | 1.49700 | 81.6 |
| 21 | −16.5860 | 1.30 | 1.85026 | 32.4 |
| 22 | −55.6622 | Bf | | |

[Aspherical Data]
Surface Number: 3

K = 1
A4 = 2.62050E−05
A6 = 5.94080E−08
A8 = −4.88100E−11
A10 = 7.61030E−13

TABLE 5-continued

[Specifications]

| | |
|---|---|
| f | 18.5 |
| FNO | 3.8 |
| 2ω | 77.4 |
| Y | 14.00 |
| TL | 131.3 |
| Bf | 38.1 |

[Lens Group Data]

| Group | i | focal length |
|---|---|---|
| 1 | 1 | −25.0 |
| 2 | 8 | 28.2 |
| 3 | 14 | −41.4 |
| 4 | 18 | 46.9 |

[Values for Conditional Expressions]

| | |
|---|---|
| (1): | nA(L31) = 1.94595 |
| | nA(L43) = 1.85026 |
| (2): | fA/fG(L31) = −0.74 |
| | fA/fG(L43) = −0.60 |
| (3): | vA(L31) = 18.0 |
| | vA(L43) = 32.4 |
| (4): | nd(L31) = 1.94595 |

Figure 18A:
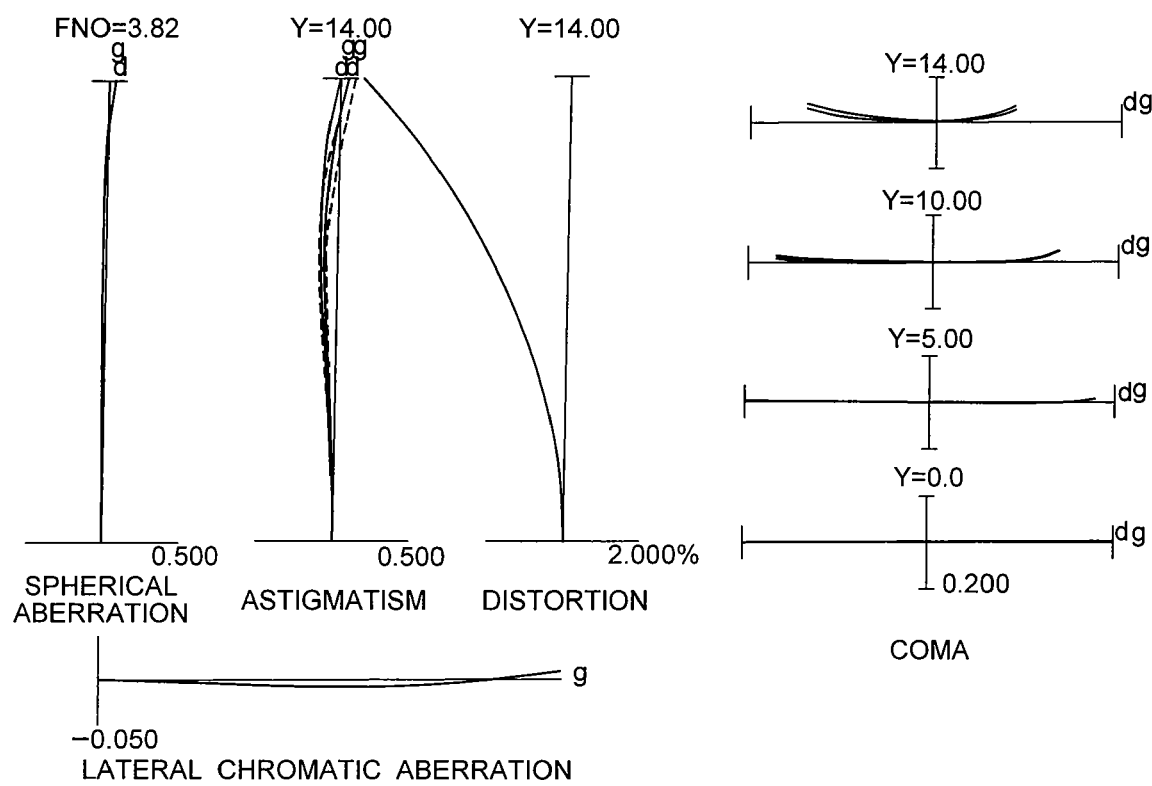
Figure 18B:
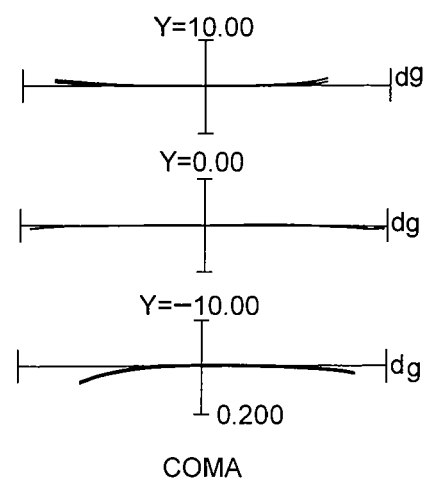

FIGS. 18A and 18B are graphs showing various aberrations of the optical system according to Example 5 upon focusing on infinity, in which FIG. 18A shows various aberrations without performing vibration reduction, and FIG. 18B shows coma upon performing vibration reduction with respect to a rotational camera shake of 0.734 degrees.

As is apparent from the respective graphs, the optical system according to Example 5 shows superb optical performance as a result of good corrections to various aberrations.

As described above, each Example according to the present application makes it possible to provide an optical system having excellent optical performance with sufficiently correcting lateral chromatic aberration and curvature of field. Each Example makes it possible to reduce the number of lens elements. Moreover, in Example 1 through 4, it becomes possible to provide a zoom lens system having a zoom ratio of about three.

In each Example described above, an optical system having an A lens (L31) satisfying all conditional expressions of the present invention disposed in the third lens group is shown. However, the present invention is not limited to this. The effect of the present invention can be achieved by introducing at least one A lens in at least one of the first lens group, the second lens group, the third lens group and the fourth lens group in the optical system.

Although an optical system with a four-lens-group configuration is shown as each Example of the present application, lens configuration of the optical system according to the present application is not limited to this, and other lens-group configurations such as a five-lens-group configuration can be applied.

In the present optical system, in order to focusing from infinity to a close object, a portion of a lens group or a lens group may be moved along an optical axis as a focusing lens group. The focusing lens group may be used for an auto focus, and is suitable for being driven by a motor such as an ultrasonic motor. In particular in the optical system according to the present application, it is preferable that the first lens group or a portion of the first lens group is used as the focusing lens group.

In each Example described above, although the optical system that the third lens group is shifted in a direction perpendicular to the optical axis as a vibration reduction lens group is shown, a lens group or a portion of a lens group of the other lens groups may be used as a vibration reduction lens group. In an optical system according to the present application, it is particularly preferable that the third lens group or a portion of the third lens group is used as a vibration reduction lens group.

Moreover, in an optical system according to the present application, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of an optical system according to the present application to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices.

Then, a camera equipped with an optical system according to the present application is explained below with reference to FIG. 19.

Figure 19:
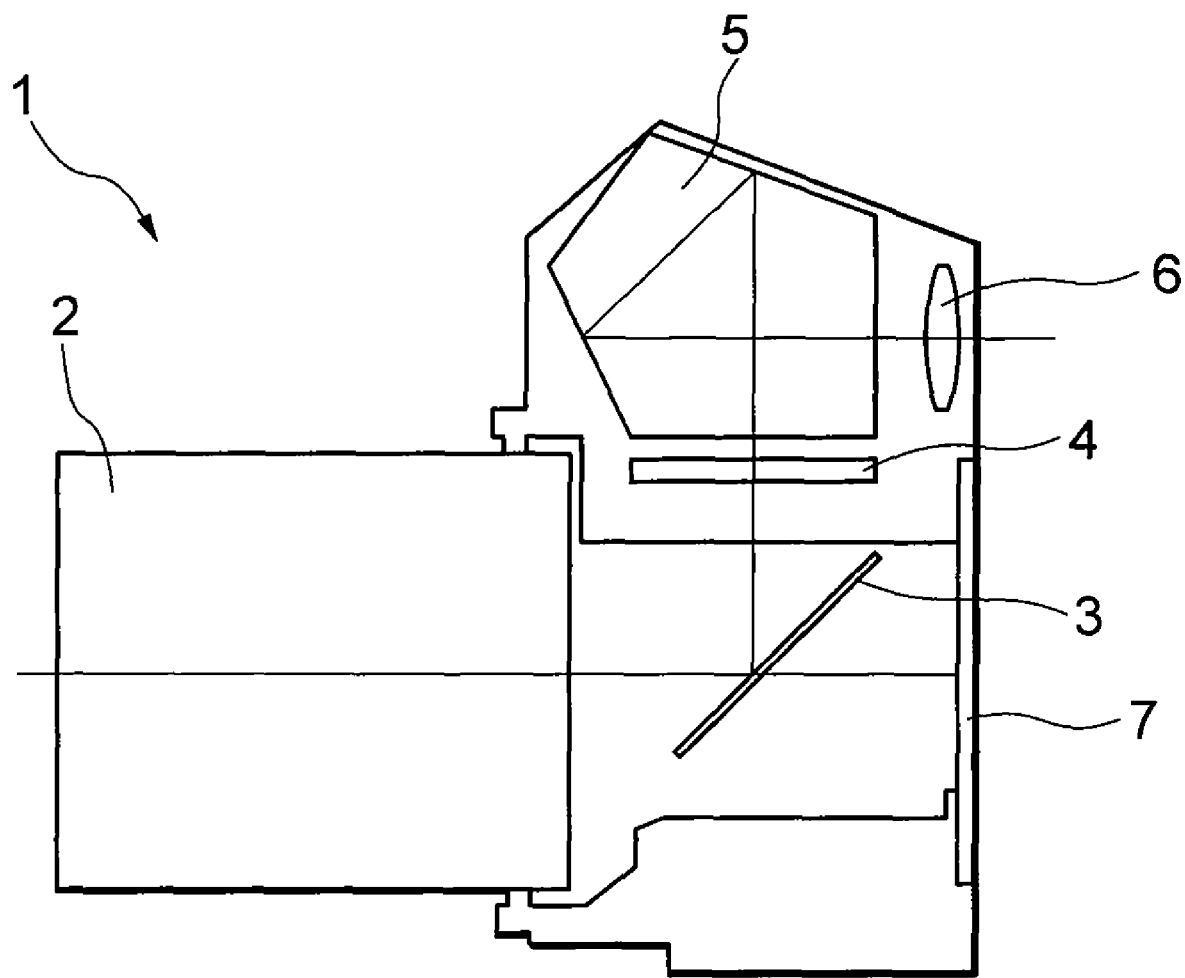
FIG. 19 is a graph showing a camera equipped with the optical system according to Example 1 of the present application.

FIG. 19 is a schematic diagram showing a camera equipped with the optical system according to Example 1 of the present application.

As shown in FIG. 19, the camera 1 is a single-lens reflex digital camera equipped with the zoom lens system according to Example 1 as an image-taking lens 2.

In the camera 1, light emitted from an object (not shown) is converged by the image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is removed from an optical path, and the light from the object (not shown) reaches an imaging device 7. Accordingly, light from the object is captured by the imaging device 7 and stored in a memory (not shown) as the object image. In this manner, the photographer can take a picture of the object by the camera 1.

The optical system according to Example 1 of the present embodiment attached to the camera 1 as an image-taking lens 2 makes it possible to realize excellent optical performance by means of the specific lens configuration. Accordingly, the camera 1 makes it possible to realize excellent optical performance.

It is needless to say that the same result as the camera 1 described above is obtained by constructing a camera equipped with the optical system according to any of Examples 2 through 5 as an image-taking lens 2.

As described above, it becomes possible to provide an optical system having excellent optical performance, an imaging apparatus, and a method for forming an image by the optical system.

What is claimed is:

1. An optical system comprising, in order from the object:
a first lens group having negative refractive power;
a second lens group having positive refractive power;
a third lens group having negative refractive power; and
a fourth lens group having positive refractive power;

at least one of the first lens group, the second lens group, the third lens group, and the fourth lens group has at least one A lens which satisfies the following conditional expressions:

$$1.85000 < nA$$

$$-0.92 < fA/fG < -0.10$$

where nA denotes a refractive index of a medium of the A lens at d-line in which wavelength λ=587.6 nm, fA denotes a focal length of the A lens, and fG denotes a focal length of the lens group having the A lens; and a lens group or a portion of a lens group in the optical system being shifted as a vibration reduction lens group in a direction perpendicular to the optical axis for correcting an image blur upon generating a camera shake, and the vibration reduction lens group includes the A lens.

2. The optical system according to claim 1, wherein the A lens satisfies the following conditional expression:

$$vA < 45.0$$

where vA denotes an Abbe number of the medium of the A lens at d-line in which wavelength λ=587.6 nm.

3. The optical system according to claim 1, wherein the vibration reduction lens group is at least a portion of the third lens group.

4. The optical system according to claim 1, wherein at least one said A lens is cemented with another lens.

5. The optical system according to claim 1, wherein at least one lens group having the A lens is composed of two lenses or less.

6. The optical system according to claim 1, wherein a distance between the first lens group and the second lens group, a distance between the second lens group and the third lens group, and a distance between the third lens group and the fourth lens group are changed respectively upon varying a focal length from a wide-angle end state to a telephoto end state.

7. The optical system according to claim 1, wherein the second lens group and the fourth lens group are moved in a body upon varying a focal length from the wide-angle end state to the telephoto end state.

8. An imaging apparatus equipped with the optical system according to claim 1.

9. An optical system comprising, in order from an object:
a first lens group having negative refractive power;
a second lens group having positive refractive power;
a third lens group having negative refractive power; and
a fourth lens group having positive refractive power;
at least one of the first lens group, the second lens group, the third lens group, and the fourth lens group having at least one A lens which satisfies the following conditional expression:

$$1.87300 < nA$$

where nA denotes a refractive index of a medium of the A lens at d-line in which wavelength λ=587.6 nm, and
wherein a lens group or a portion of a lens group in the optical system is shifted as a vibration reduction lens group in a direction perpendicular to the optical axis for correcting an image blur upon generating a camera shake, and the vibration reduction lens group includes the A lens.

10. The optical system according to claim 9, wherein the A lens satisfies the following conditional expression:

$$vA < 45.0$$

where vA denotes an Abbe number of the medium of the A lens at d-line in which wavelength λ=587.6 nm.

11. The optical system according to claim 9, wherein the vibration reduction lens group is at least a portion of the third lens group.

12. The optical system according to claim 9, wherein at least one said A lens is cemented with another lens.

13. The optical system according to claim 9, wherein at least one lens group having the A lens is composed of two lenses or less.

14. The optical system according to claim 9, wherein a distance between the first lens group and the second lens group, a distance between the second lens group and the third lens group, and a distance between the third lens group and the fourth lens group are changed respectively upon varying a focal length from a wide-angle end state to a telephoto end state.

15. The optical system according to claim 9, wherein the second lens group and the fourth lens group are moved in a body upon varying a focal length from the wide-angle end state to the telephoto end state.

16. An imaging apparatus equipped with the optical system according to claim 9.

17. A method for forming an image of an optical system, comprising a step of:
providing the optical system including, in order from an object, a first lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expressions:

$$1.85000 < nA$$

$$-0.92 < fA/fG < -0.10$$

where nA denotes a refractive index of the medium of the A lens at d-line in which wavelength λ=587.6 nm, fA denotes a focal length of the A lens, and fG denotes a focal length of the lens group having the A lens; and
a lens group or a portion of a lens group in the optical system being shifted as a vibration reduction lens group in a direction perpendicular to the optical axis for correcting an image blur upon generating a camera shake, and the vibration reduction lens group includes the A lens.

18. The method according to claim 17, wherein the following conditional expression is satisfied;

$$vA < 45.0$$

where vA denotes an Abbe number of the medium of the A lens at d-line in which wavelength λ=587.6 nm.

19. The method according to claim 17, wherein at least one said A lens is cemented with another lens.

20. The method according to claim 17, further comprising a step of:
changing a distance between the first lens group and the second lens group, a distance between the second lens group and the third lens group, and a distance between the third lens group and the fourth lens group respectively upon varying a focal length from a wide-angle end state to a telephoto end state.

21. A method for forming an image of an optical system, comprising a step of:
providing the optical system including, in order from an object, a first lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expression:

$1.87300 < nA$ where nA denotes a refractive index of a medium of the A lens at d-line in which wavelength $\lambda=587.6$ nm, and
wherein a lens group or a portion of a lens group in the optical system is shifted as a vibration reduction lens group in a direction perpendicular to the optical axis for correcting an image blur upon generating a camera shake, and the vibration reduction lens group includes the A lens.

22. The method according to claim 21, wherein the following conditional expression is satisfied:

$vA < 45.0$ where vA denotes an Abbe number of the medium of the A lens at d-line in which wavelength $\lambda=587.6$ nm.

23. The method according to claim 21, wherein at least one of the A lens is cemented with another lens.

24. The method according to claim 21, further comprising a step of:
changing a distance between the first lens group and the second lens group, a distance between the second lens group and the third lens group, and a distance between the third lens group and the fourth lens group respectively upon varying a focal length from a wide-angle end state to a telephoto end state.

25. An optical system comprising, in order from an object:
a first lens group having negative refractive power;
a second lens group having positive refractive power;
a third lens group having negative refractive power; and
a fourth lens group having positive refractive power;
at least one of the first lens group, the second lens group, the third lens group, and the fourth lens group having at least one A lens which satisfies the following conditional expressions:

$1.85000 < nA$ $-0.92 < fA/fG < -0.10$ where nA denotes a refractive index of a medium of the A lens at d-line in which wavelength $\lambda=587.6$ nm, fA denotes a focal length of the A lens, and fG denotes a focal length of the lens group having the A lens; and
the second lens group and the fourth lens group being moved in a body upon varying a focal length from the wide-angle end state to the telephoto end state.

26. An optical system comprising, in order from an object:
a first lens group having negative refractive power;
a second lens group having positive refractive power;
a third lens group having negative refractive power; and
a fourth lens group having positive refractive power;
at least one of the first lens group, the second lens group, the third lens group, and the fourth lens group having at least one A lens which satisfies the following conditional expressions:

$1.85000 < nA$ $-0.88 < fA/fG < -0.20$ where nA denotes a refractive index of a medium of the A lens at d-line in which wavelength $\lambda=587.6$ nm, fA denotes a focal length of the A lens, and fG denotes a focal length of the lens group having the A lens.

27. The optical system according to claim 26, wherein the A lens satisfies the following conditional expression:

$-0.61 \leq fA/fG < -0.20$

28. A method for forming an image with an optical system, comprising a step of:
providing the optical system including, in order from an object, a first lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expressions:

$1.85000 < nA$ $-0.92 < fA/fG < -0.10$ where nA denotes a refractive index of a medium of the A lens at d-line in which wavelength $\lambda=587.6$ nm, fA denotes a focal length of the A lens, and fG denotes a focal length of the lens group having the A lens; and
wherein the second lens group and the fourth lens group are moved in a body upon varying a focal length from the wide-angle end state to the telephoto end state.

29. A method for forming an image with an optical system, comprising a step of:
providing the optical system including, in order from an object, a first lens group having negative refractive power, a second lens group having positive refractive power, a third lens group having negative refractive power, and a fourth lens group having positive refractive power, at least one of the first lens group, the second lens group, the third lens group, and the fourth lens group having at least one A lens that satisfies the following conditional expressions:

$1.85000 < nA$ $-0.88 < fA/fG < -0.20$ where nA denotes a refractive index of a medium of the A lens at d-line in which wavelength $\lambda=587.6$ nm, fA denotes a focal length of the A lens, and fG denotes a focal length of the lens group having the A lens.

30. The method according to claim 29, wherein the A lens satisfies the following conditional expression:

$-0.61 \leq fA/fG < -0.20$

* * * * *